United States Patent
Watanabe et al.

(10) Patent No.: US 9,159,970 B2
(45) Date of Patent: Oct. 13, 2015

(54) BATTERY PACK AND ELECTRICALLY POWERED VEHICLE INCLUDING THE BATTERY PACK

(75) Inventors: Minoru Watanabe, Ritto (JP); Shingo Kawahara, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 387 days.

(21) Appl. No.: 13/200,394

(22) Filed: Sep. 23, 2011

(65) Prior Publication Data
US 2012/0082875 A1    Apr. 5, 2012

(30) Foreign Application Priority Data

Sep. 30, 2010 (JP) ................. 2010-222656

(51) Int. Cl.
*H01M 10/00* (2006.01)
*H01M 2/02* (2006.01)
*H01M 2/10* (2006.01)
(Continued)

(52) U.S. Cl.
CPC .......... *H01M 2/1077* (2013.01); *H01M 10/613* (2015.04); *H01M 10/625* (2015.04); *H01M 10/647* (2015.04); *H01M 10/6563* (2015.04); *H01M 10/6566* (2015.04)

(58) Field of Classification Search
CPC ............ H01M 10/613; H01M 10/625; H01M 10/647; H01M 10/6563; H01M 10/6566; H01M 2/1077
USPC .................. 429/71, 72, 82, 83, 120, 122, 148, 429/149–159; 180/65.31
See application file for complete search history.

(56) References Cited

U.S. PATENT DOCUMENTS

| 4,522,898 A | 6/1985 | Esrom |
| 8,003,245 B2 | 8/2011 | Lee et al. |

(Continued)

FOREIGN PATENT DOCUMENTS

| CN | 101010814 A | 8/2007 |
| CN | 101682005 A | 3/2010 |

(Continued)

OTHER PUBLICATIONS

Machine translation of JP2004103364 (Oya).*

(Continued)

*Primary Examiner* — Carlos Barcena
*Assistant Examiner* — Lilia V Nedialkova
(74) *Attorney, Agent, or Firm* — McGinn IP Law Group, PLLC.

(57) ABSTRACT

Provided is a battery pack that can uniformly cool a plurality of electric cells, prevent a breakdown of the electric cells, and provide high performance of all electric cells. The battery pack includes a packaging case in which: each adjacent ones of a plurality of electric cells in the first direction define a ventilation space; first and second passages are defined that extend in the first direction and that are arranged to have the plurality of electric cells located between the first and second passages in a second direction intersecting the first direction, wherein gas supplied to the first passage flows through the ventilation spaces to the second passage; and a flow rate limitation device is provided that is arranged in an upstream area of the first passage and that limits a flow rate of the gas flowing through one of the plurality of ventilation spaces, which leads to the upstream area of the first passage, to a predetermined flow rate.

18 Claims, 18 Drawing Sheets

(51) Int. Cl.
*H01M 10/625* (2014.01)
*H01M 10/6563* (2014.01)
*H01M 10/647* (2014.01)
*H01M 10/6566* (2014.01)
*H01M 10/613* (2014.01)

(56) References Cited

U.S. PATENT DOCUMENTS

| | | | |
|---|---|---|---|
| 8,114,535 | B2 | 2/2012 | Ghosh et al. |
| 8,507,121 | B2 | 8/2013 | Saito et al. |
| 8,748,027 | B2 | 6/2014 | Im et al. |
| 2002/0085355 | A1* | 7/2002 | Oda et al. ............... 361/695 |
| 2007/0026301 | A1 | 2/2007 | Lee et al. |
| 2007/0202792 | A1 | 8/2007 | Shimizu et al. |
| 2008/0274397 | A1 | 11/2008 | Watanabe |
| 2008/0318118 | A1 | 12/2008 | Ghosh et al. |
| 2009/0274952 | A1* | 11/2009 | Wood et al. ............... 429/99 |
| 2010/0136402 | A1 | 6/2010 | Hermann et al. |
| 2010/0285347 | A1* | 11/2010 | Saito et al. ............... 429/120 |
| 2010/0297486 | A1 | 11/2010 | Fujii |
| 2011/0020677 | A1* | 1/2011 | Shin et al. ............... 429/71 |
| 2011/0104547 | A1 | 5/2011 | Saito et al. |
| 2011/0262791 | A1 | 10/2011 | Im et al. |
| 2014/0178734 | A1 | 6/2014 | Im et al. |

FOREIGN PATENT DOCUMENTS

| | | | | |
|---|---|---|---|---|
| CN | 101689687 | A | 3/2010 | |
| EP | 2 362 462 | A1 | 8/2011 | |
| JP | 59-171476 | A | 9/1984 | |
| JP | 2000-243461 | A | 9/2000 | |
| JP | 2001-185103 | A | 7/2001 | |
| JP | 2001-313090 | A | 11/2001 | |
| JP | 2002-33137 | A | 1/2002 | |
| JP | 2004103364 | * | 9/2002 | ............ H01M 10/50 |
| JP | 2004-103364 | A | 4/2004 | |
| JP | 2006-156171 | A | 6/2006 | |
| JP | 2006-179190 | A | 7/2006 | |
| JP | 2006-286519 | A | 10/2006 | |
| JP | 2007-042637 | A | 2/2007 | |
| JP | 2007-234367 | A | 9/2007 | |
| JP | 2007-250515 | A | 9/2007 | |
| JP | 2009-004378 | A | 1/2009 | |
| JP | 2010-529635 | A | 8/2010 | |
| JP | 2010-272251 | A | 12/2010 | |
| JP | 2011-096478 | A | 5/2011 | |
| WO | WO 2006/022050 | A1 | 3/2006 | |
| WO | WO 2006022050 | A1 * | 3/2006 | |
| WO | WO 2008/153326 | A2 | 12/2008 | |
| WO | WO 2009002096 | A1 * | 12/2008 | |

OTHER PUBLICATIONS

European Search Report dated Dec. 20, 2011.

* cited by examiner

F I G . 11
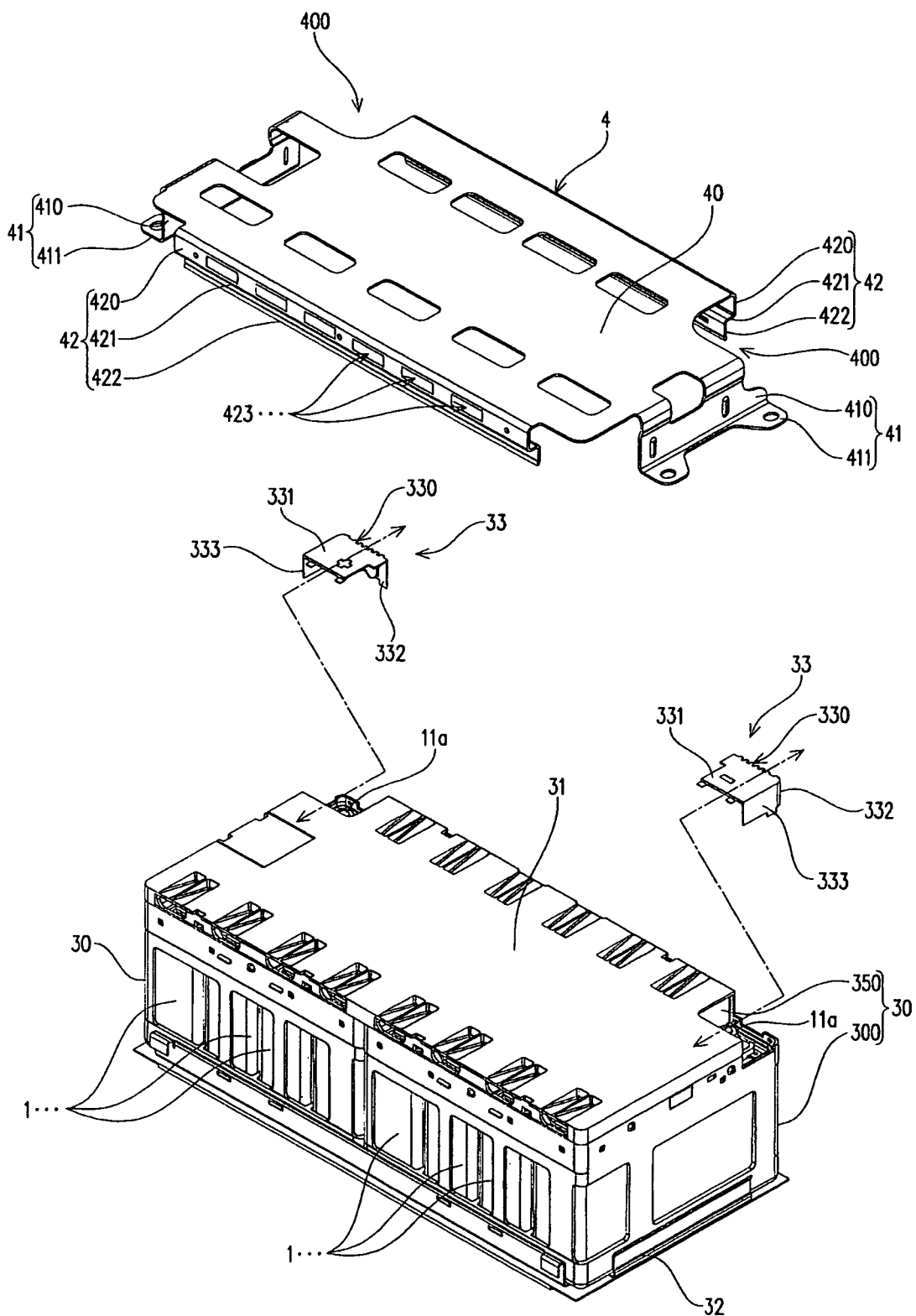

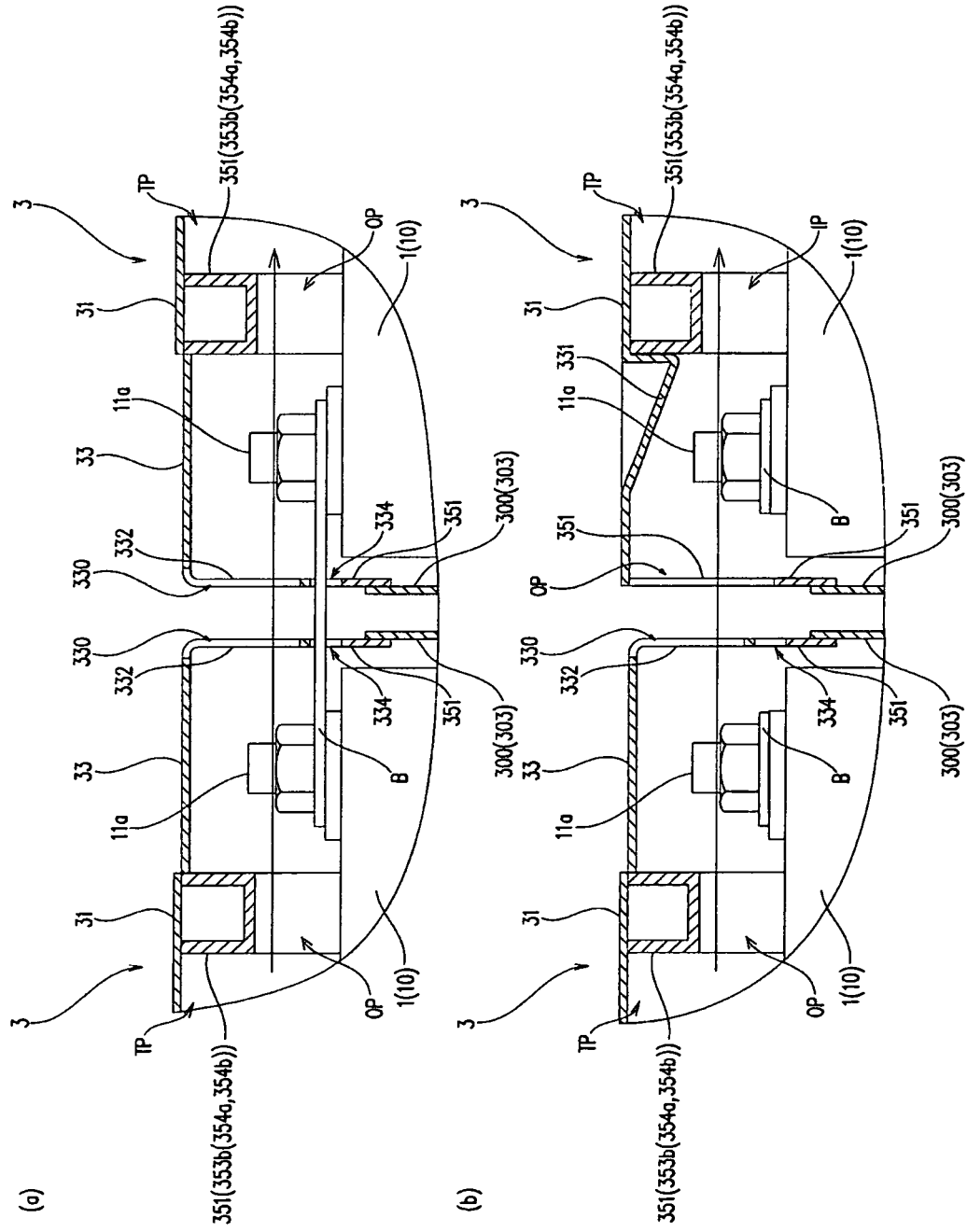

BATTERY PACK AND ELECTRICALLY POWERED VEHICLE INCLUDING THE BATTERY PACK

CROSS REFERENCE TO RELATED APPLICATION

This application claims priority from Japanese Patent Application No. 2010-222656, which is incorporated herein by reference.

TECHNICAL FIELD

The present invention relates to a battery pack adopted as a power source of various devices. More specifically, the present invention relates to a battery pack including a high-capacity assembled battery constituted by a plurality of electric cells and to an electrically powered vehicle including the battery pack.

BACKGROUND ART

Conventionally, there are various types of power sources for various devices that require a large amount of power. A battery pack that includes a plurality of electric cells and a packaging case accommodating the plurality of electric cells is known as an example of the power sources.

In recent years, hybrid electric vehicles that emit less $CO_2$ and electric vehicles that do not emit $CO_2$ (hereinafter, the vehicles will be collectively referred to as "electrically powered vehicles") are widely used from the viewpoint of environmental protection. The battery packs are adopted as driving sources of the electrically powered vehicles and as power sources for supplying power to control systems.

This type of battery pack adopts a rechargeable secondary cell as an electric cell. However, the electric cell (secondary cell) tends to generate heat due to charge and discharge, and an excessive temperature rise of the electric cell causes a reduction in performance of the electric cell and a shortened life span.

Consequently, a battery pack has been proposed in which a plurality of electric cells are aligned and accommodated in a packaging case, and first and second passages are arranged with the plurality of electric cells interposed therebetween.

In the battery pack, the plurality of electric cells are arranged so that ventilation spaces through which gas flows are formed between adjacent electric cells. Therefore, if gas, such as open air, is supplied to the first passage, the gas flows from the first passage to the second passage through the ventilation spaces (cf., JP-A-2000-243461, for example).

As a result, the gas flowing though the ventilation spaces cools the electric cells on both sides of the ventilation spaces in the battery pack, preventing an excessive temperature rise of the electric cells. It is therefore supposed that the life span of the electric cells is not reduced, and the electric cells can provide necessary performance.

However, the gas is supplied to the first passage from a predetermined location of the first passage in the battery pack, and therefore the electric cells in a downstream area of the first passage may not be sufficiently cooled.

Specifically, if the number of electric cells arranged in the packaging case is larger, the length of the first passage is longer in accordance with the number of electric cells. Therefore, the pressure loss of the first passage cumulatively increases from the upstream to the downstream. More specifically, a large amount of gas flows into the ventilation spaces in an upstream area with a small pressure loss in the first passage, while the gas is not sufficiently supplied to the ventilation spaces in the downstream area with a large pressure loss. Therefore, the electric cells in the downstream area of the first passage may not be sufficiently cooled in the battery pack.

Therefore, not only the possibility of a breakdown of the electric cells in the downstream area of the first passage increases in the battery pack, but there are also variations in temperature between the electric cells in the upstream area of the first passage and the electric cells in the downstream area of the first passage. There is a problem that the performance of all electric cells cannot be sufficiently achieved.

SUMMARY OF THE INVENTION

An object of the present invention is to provide a battery pack that can uniformly cool a plurality of electric cells, prevent a breakdown of the electric cells, and achieve sufficient performance of all electric cells and to provide an electrically powered vehicle including the battery pack.

According to an embodiment of the present invention, there is provided a battery pack including:

a plurality of electric cells; and a packaging case that accommodates the plurality of electric cells to align the plurality of electric cells at least in a first direction, wherein each adjacent ones of the plurality of electric cells in the first direction defines a ventilation space, the packaging case defines first and second passages that extend in the first direction and that are arranged to have the plurality of electric cells located between the first and second passages in a second direction intersecting the first direction, wherein gas supplied to the first passage flows through the ventilation spaces to the second passage, and the packaging case includes a flow rate limitation member that is arranged in an upstream area of the first passage to limit a flow rate of the gas flowing into at least one of the ventilation spaces, which communicate with the upstream area of the first passage, to a predetermined flow rate.

In another embodiment of the battery pack, the flow rate limitation member may be composed of a plate material that includes at least one of ventilation sections, the plate material being arranged to cover the at least one of the ventilation spaces.

In still another embodiment of the battery pack, the ventilation section may include a plurality of openings located along the first passage.

In yet another embodiment of the battery pack, the packaging case may include an inner wall surface, the first passage may be defined between an alignment of the electric cells positioned at an outermost end in the second direction and the inner wall surface of the packaging case, and the flow rate limitation member may be arranged to slope downward from the alignment of the electric cells to the inner wall surface of the packaging case.

In another embodiment of the battery pack, the packaging case may include a plurality of separation sections located at intervals in the first direction, the separation sections dividing an interior of the packaging case into a plurality of areas;

the electric cells may be arranged in the areas; and each of the separation sections may have a through-hole at positions intersecting the first and second passages.

In still another embodiment of the battery pack, a plurality of cell modules are provided, each of which is made up of a predetermined number of the electric cells aligned in the first direction, and the flow rate limitation member may be provided corresponding to at least one of the plurality of cell modules, which are in contact with the upstream area of the first passage.

In yet another embodiment of the battery pack,
the first passage may be defined to have a cross-sectional area of the upstream area of the first passage being smaller than a cross-sectional area of the first passage in downstream.

In another embodiment of the battery pack,
the packaging case may include a tray on which the plurality of electric cells are mounted and a cover that covers the plurality of electric cells on the tray, and
a sealing member that blocks a space defined between the plurality of electric cells and the cover may be provided between the plurality of electric cells and the cover.

In this case, the cover may have an air intake opening at a position corresponding to the upstream area of the first passage, and an exhaust opening at a position corresponding to a downstream area of the second passage; and
a suction blower may be mounted around the exhaust opening.

In this case, the cover may have an air intake opening at a position corresponding to the upstream area of the first passage, and an exhaust opening at a position corresponding to a downstream area of the second passage; and
a blower may be mounted around the intake opening.

In still another embodiment of the battery pack,
each of the plurality of electric cells may have a greater width in the second direction than in the first direction.

According to another aspect of the present invention, an electrically powered vehicle includes any of the battery packs described above as a power source.

BRIEF DESCRIPTION OF THE DRAWINGS

FIG. 11 is a perspective view of the cell module and the module fixation member according to the embodiment in a state in which a terminal cover is removed according to the embodiment;

FIGS. 18A and 18B are partially schematic cross-sectional views for explaining flows of gas in the battery pack according to the embodiment, FIG. 18A showing a partially enlarged schematic cross-sectional view for explaining a flow of gas between terminal covers of adjacent cell modules, FIG. 18B showing a partially enlarged schematic cross-sectional view for explaining a flow of gas between the terminal covers and frame sections of adjacent cell modules.

DETAILED DESCRIPTION OF THE PREFERRED EMBODIMENTS

An embodiment of the present invention will now be described with reference to the attached drawings.

Figure 1:
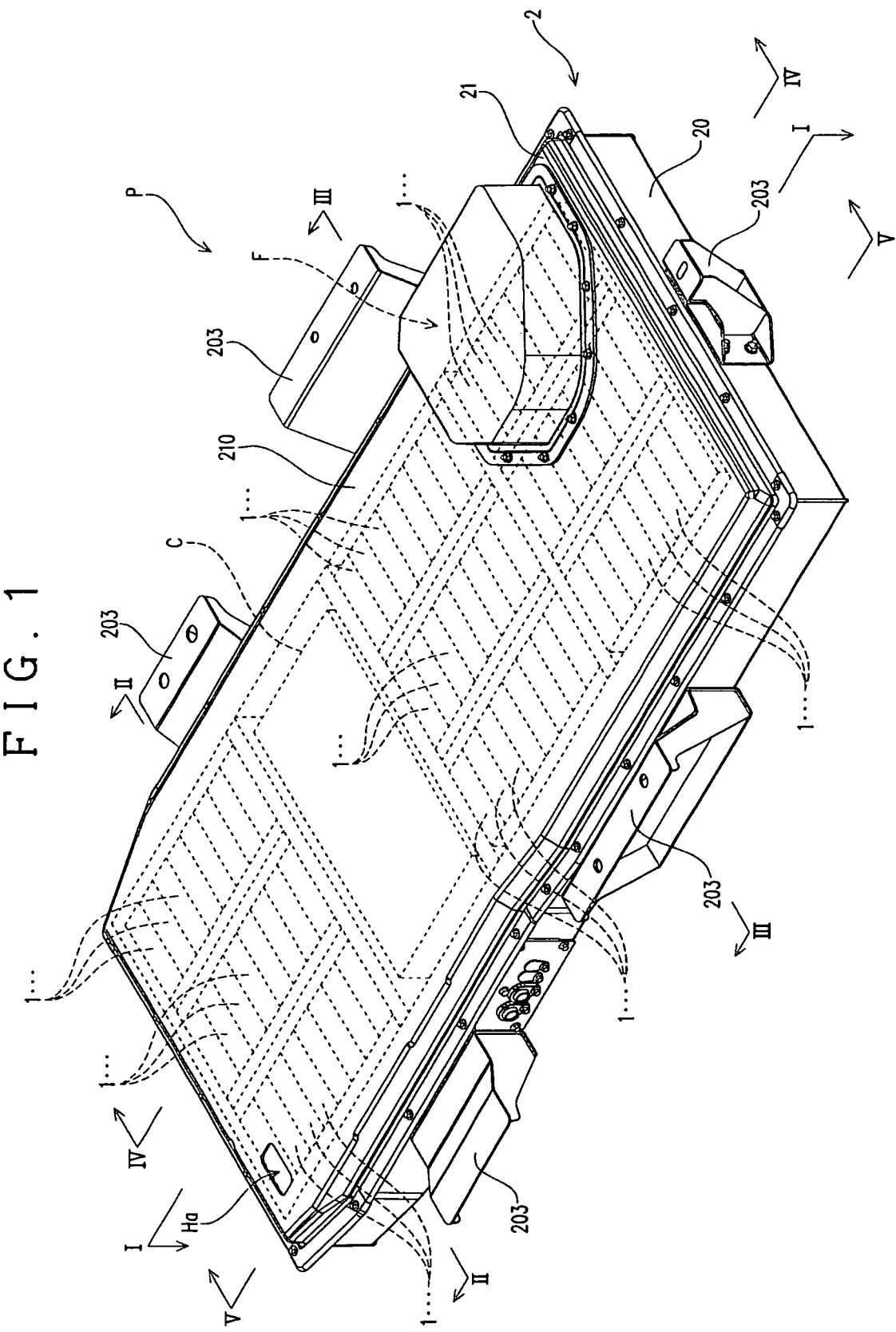
FIG. 1 is an overall perspective view of a battery pack according to an embodiment of the present invention.

A battery pack according to the present embodiment is adopted as a power source of an electrically powered vehicle, such as an electric vehicle (EV) and a hybrid electric vehicle (HEV). As shown in FIG. 1, the battery pack includes a plurality of electric cells 1 and a packaging case 2 that accommodates the plurality of electric cells 1.

Figure 2:
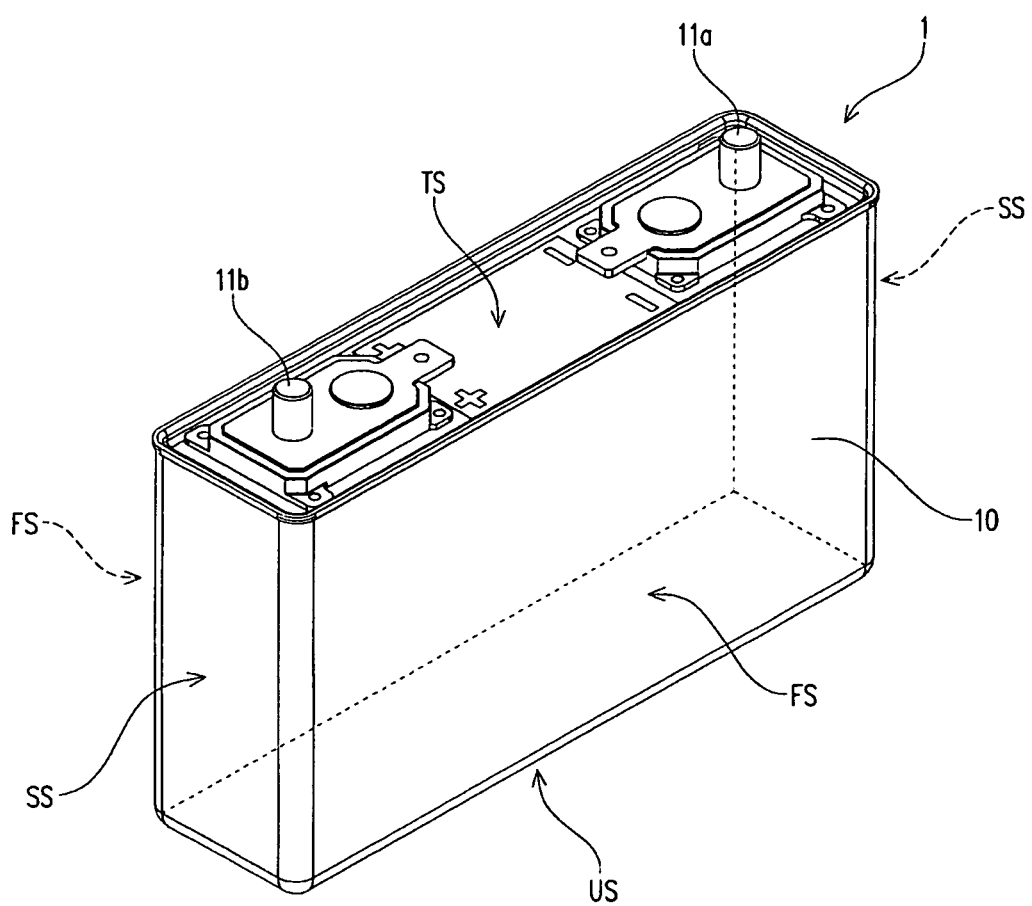
FIG. 2 is an overall perspective view of an electric cell in the battery pack according to the embodiment.

As shown in FIG. 2, the electric cell 1 includes an electrode element (not shown), a cell case 10 that accommodates the electrode element, and connection terminals 11a and 11b for external connection arranged on an outer surface of the cell case 10. The connection terminals 11a and 11b are electrically connected to the electrode element.

The electric cell 1 is a so-called rectangular cell in which the cell case 10 is formed in a six-sided shape. The positive electrode connection terminal 11a and the negative electrode connection terminal 11b are arranged at intervals on one of the six sides constituting the outer surfaces of the cell case 10. Although the connection terminals 11a and 11b can be arranged in any of vertical and horizontal directions in the electric cell 1 of this type, the connection terminals 11a and 11b are arranged upward in the present embodiment.

In the cell case 10, a surface TS (hereinafter referred to as "top surface") on which the connection terminal 11a and 11b are arranged and a surface US (hereinafter referred to as "under surface") on the opposite side of the tope surface TS are formed in rectangular shapes. Two surfaces SS (hereinafter referred to as "side surfaces") that connect ends in a longitudinal direction of the top surface TS and ends in the longitudinal direction of the under surface US are formed in a vertically elongated rectangular shape. Two surfaces FS (hereinafter referred to as "front surfaces") that connect ends in a direction orthogonal to the longitudinal direction of the top surface TS and ends in the direction orthogonal to the longitudinal direction of the under surface US are formed in a rectangular shape with their long sides extending between the two side surfaces SS.

More specifically, the size of the cell case 10 in the direction orthogonal to the longitudinal direction of the top surface TS and the under surface US (direction in which the two front surfaces FS are aligned: hereinafter referred to as "depth direction") is smaller than the size of the cell case 10 in the longitudinal direction of the top surface TS and the under surface US (direction in which the two side surfaces SS are aligned: hereinafter referred to as "transverse direction). Therefore, the surface area of the front surfaces FS is the largest among the six sides constituting the outer surfaces of the cell case 10. The positive electrode connection terminal 11*a* and the negative electrode connection terminal 11*b* are arranged at an interval in the transverse direction on the top surface TS of the cell case 10. In the following description, the direction in which the top surface TS and the under surface US of the electric cell 1 are aligned will be referred to as a vertical direction for the sake of convenience.

Figure 3:
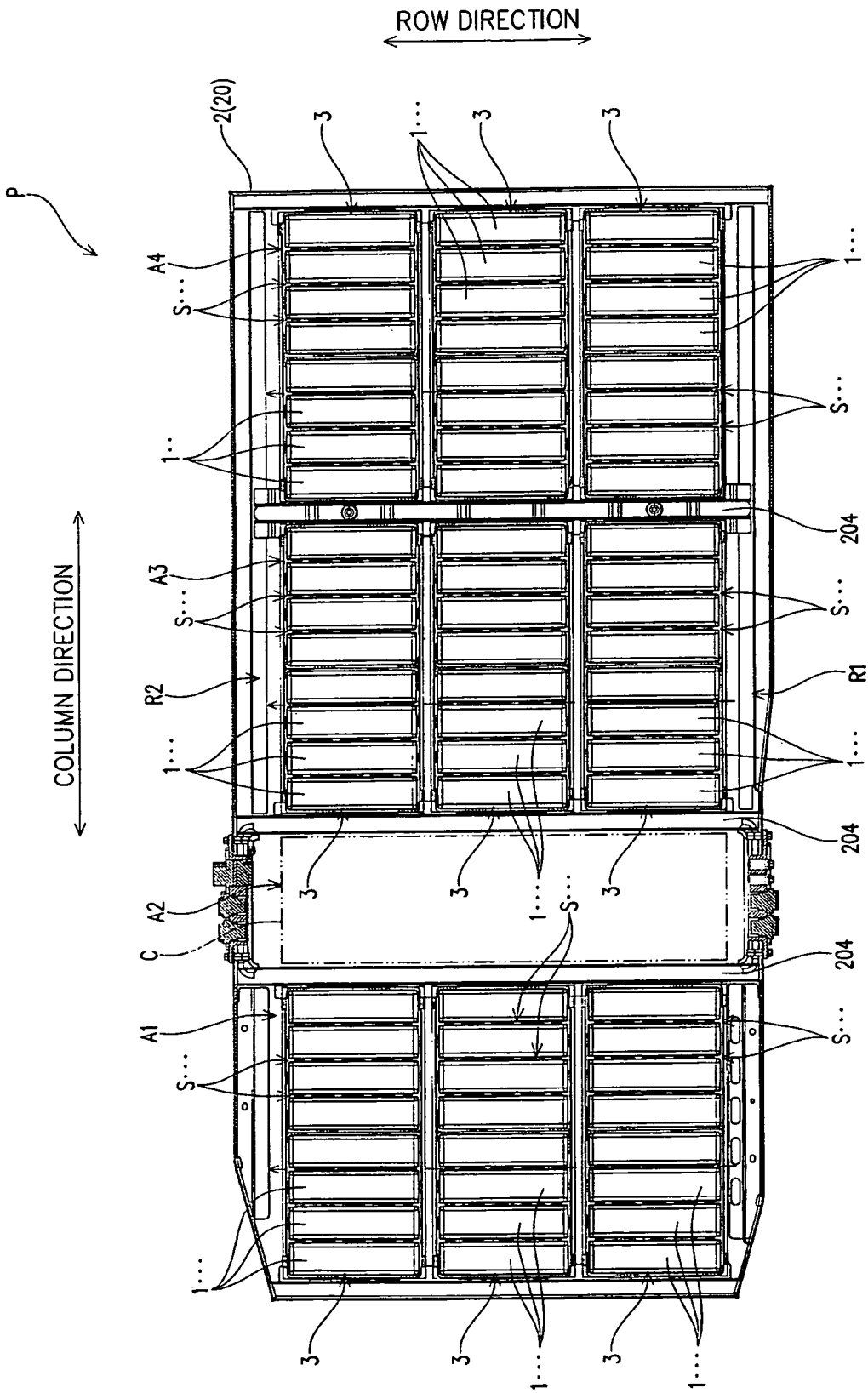
FIG. 3 is a horizontal cross-sectional view of the battery pack according to the embodiment taken along lines I-I of FIG. 1, in which link arms are not shown.

As shown in FIGS. 3 to 6, the plurality of electric cells 1 are lined up in the packaging case 2. In the present embodiment, the plurality of electric cells 1 are lined up to form a plurality of columns (three columns) as shown in FIG. 3. More specifically, the plurality of electric cells 1 are aligned in the longitudinal direction and in the lateral direction, so as to be arranged in a matrix in the present embodiment. Hereinafter, the line in the longitudinal direction will be referred to as a "column", and the line in the lateral direction will be referred to as a "row" in the present embodiment. The direction in which the column extends will be referred to as a "column direction", and the direction in which the row extends will be referred to as a "row direction".

The plurality of electric cells 1 are arranged to define ventilation spaces S through which a gas (cooling gas) flows between electric cells 1 adjacent in the column direction. The electric cells 1 in different columns are also aligned in the row direction in the present embodiment, and thus the ventilation spaces S in different columns are arranged in alignment.

The plurality of electric cells 1 are lined up so that the positive electrode connection terminals 11*a* and the negative electrode connection terminals 11*b* in each column are aligned in the column direction. More specifically, the electric cells 1 are arranged so that the front surfaces FS of adjacent electric cells 1 face each other in the column direction, and the side surfaces SS are flush with each other. In this manner, the ventilation spaces S formed between the electric cells 1 are defined by the front surfaces FS with the largest surface area among the six surfaces constituting the outer surfaces of the cell case 10.

The plurality of electric cells 1 are arranged so that the positive electrode connection terminal 11*a* and the negative electrode connection terminal 11*b* of adjacent electric cells in the column direction are adjacent to each other. The adjacent connection terminals 11*a* and 11*b* are electrically connected in series through a bus bar B as a connection fitting (cf., FIG. 9). In this manner, the plurality of electric cells 1 are electrically and directly connected to form a high-capacity assembled battery.

The plurality of electric cells 1 are assembled into a plurality of cell modules 3 each including a predetermined number (two or more) of the electric cells 1. More specifically, every predetermined number of electric cells 1 are integrated in the column direction, and the integrated predetermined number of electric cells 1 are sequentially connected in the column direction to form the assembled battery.

The plurality of electric cells 1 are arranged in a plurality of columns (three columns). In each column, the plurality of electric cells are assembled into a plurality of cell modules 3 each including a predetermined number of the electric cells 1.

The plurality of cell modules 3 have the same configuration as each other, each including the same number of the electric cells 1. The plurality of cell modules 3 are arranged in alignment so that the electric cells 1 are arranged in alignment. More specifically, the plurality of cell modules 3 are aligned in the column direction and the row direction and arranged in a matrix (multiple rows and multiple columns: three rows and three columns in FIG. 3). In this manner, the electric cells 1 of the cell modules 3 of each column are aligned in the column direction, and the electric cells 1 of the cell modules 3 of different columns are aligned in the row direction. Since the ventilation spaces S are formed between adjacent electric cells 1 in the column direction, the ventilation spaces S formed between the electric cells 1 of the cell modules 3 in different columns are lined up in the row direction.

Figure 7:
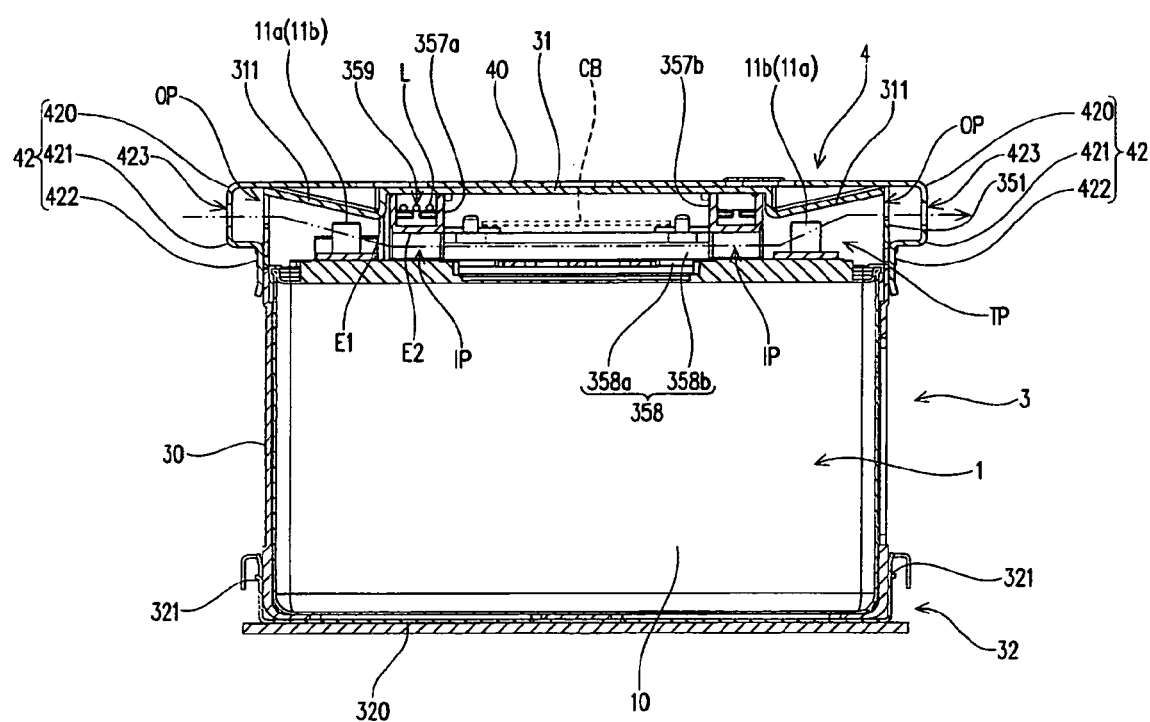
FIG. 7 is a cross-sectional view showing a state in which a module fixation member is arranged on a cell module according to the embodiment, as seen from a column direction of an electric cell alignment.
Figure 8:
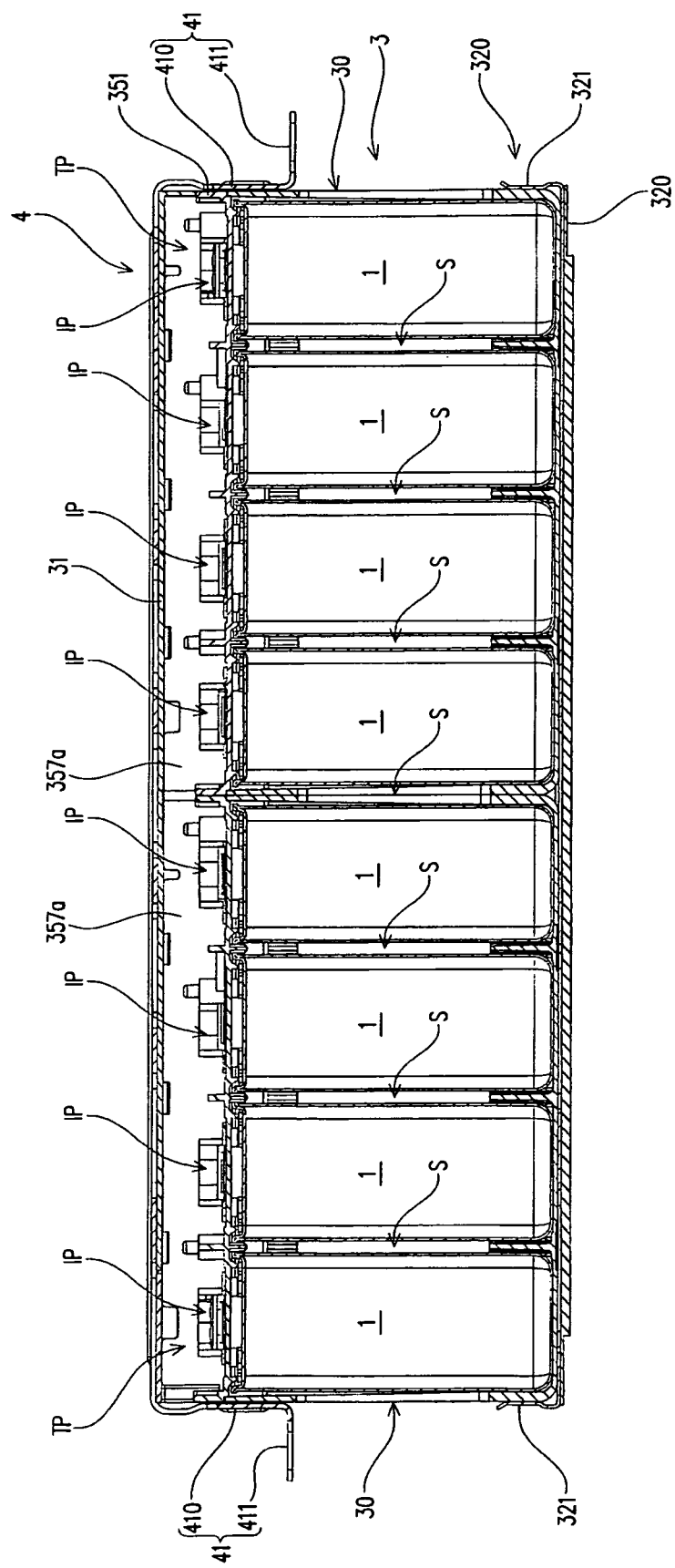
FIG. 8 is a cross-sectional view showing a state in which the module fixation member is arranged on the cell module according to the embodiment, as seen from a direction orthogonal to the column direction of the electric cell alignment between positive electrode connection terminals and negative electrode connection thermals of electric cells.

As shown in FIGS. 7 and 8, an area where the connection terminals 11*a* and 11*b* in the electric cell 1 exist can be ventilated in the cell module 3. More specifically, top passages TP through which gas flows are formed in a direction orthogonal to the vertical direction, in which the positive and negative electrode connection terminals 11*a* and 11*b* in the electric cell 1 exist. In association with this, outside ventilation openings OP for taking gas in and out of the top passages TP are formed at positions opposing the top passages TP as shown in FIG. 7.

As shown in FIG. 8, the cell module 3 can pass the gas through the ventilation spaces S between the electric cells 1 and can discharge the gas passed through the ventilation spaces S to the outside. Therefore, the cell module 3 can be ventilated both in the areas where the cell cases 10 are located and in the areas where the connection terminals 11*a* and 11*b* are located.

In the cell module 3, the electric cells 1 are aligned in the column direction with the ventilation spaces S defined therebetween. Thus, by aligning the plurality of electric cells 1 in at least the row direction, the ventilation spaces S defined between the electric cells 1 of each column are aligned in the row direction. Therefore, because of the arrangement of the plurality of cell modules 3 that are aligned in a matrix, the ventilation spaces S of the cell modules 3 of different columns are aligned in the row direction. Thus, the ventilation through the ventilation spaces S of adjacent cell modules 3 is possible (cf., FIG. 3).

The plurality of cell modules 3 have the same configuration. Therefore, by aligning the plurality of electric cells 1 in at least the row direction, outside ventilation openings OP adjacent in the row direction face each other, and the top passages TP are lined up in the row direction. Therefore, as the plurality of cell modules 3 are aligned in a matrix, the top passages TP of the cell modules 3 in different columns are lined up in the row direction, and the ventilation between the top passages TP of adjacent cell modules 3 is possible (cf., FIGS. 4 and 5).

As shown in FIGS. 7 and 8, the cell module 3 includes a frame section 351 that surrounds the positive electrode connection terminals 11*a* and the negative electrode connection terminals 11*b* of a predetermined number of electric cells 1 aligned in the column direction. More specifically, in the assembled battery in which a predetermined number of electric cells 1 are electrically connected, the connection terminals 11*a* and 11*b* are surrounded by the frame section 351 except for a pair of connection terminals 11*a* and 11*b* that serve as both ends of an electrical connection path to be connected to the outside.

The outside ventilation openings OP are formed at opposing positions of adjacent frame sections 351, and the top passages TP are formed in the areas surrounded by the frame sections 351. One of the connection terminals 11*a* and 11*b* of each of two electric cells 1 at both sides in the column direction serves as the connection terminals 11*a* and 11*b* of the assembled battery in the present embodiment, and the pair of connection terminals 11*a* and 11*b* are arranged outside the area surrounded by the frame section 351.

The cell module 3 includes a predetermined number of electric cells 1, a cell holder 30 that holds two or more electric cells 1, and a cell cover 31 that covers the top surfaces TS of the electric cells 1 held by the cell holder 30.

Figure 9:
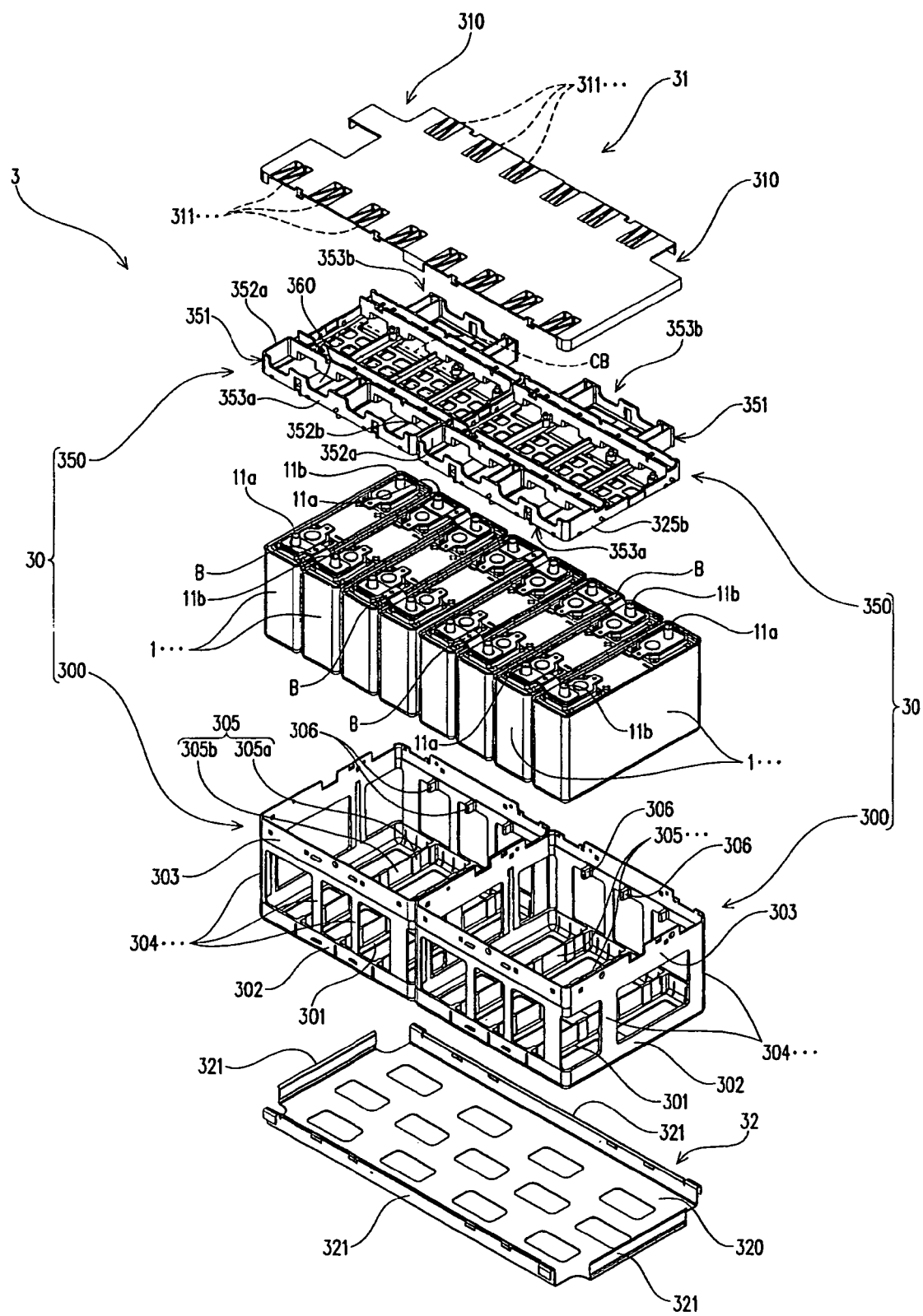
FIG. 9 is an exploded perspective view of the cell module according to the embodiment.

As shown in FIG. 9, the cell module 3 includes a plurality of cell holders 30. Based on this premise, the cell module 3 includes a tray (hereinafter referred to as "module tray") 32 that collectively supports the plurality of cell holders 30. More specifically, the predetermined number of electric cells 1 are divided into a plurality of sets in the cell module 3. Accordingly, the cell module 3 includes the cell holders 30 in the quantity corresponding to the number of the sets formed by dividing the predetermined number of electric cells 1 and includes the module tray 32 on which the cell holders 30 are horizontally arranged. Therefore, the number of electric cells 1 held by each cell holder 30 is a number obtained by dividing the predetermined number by the number of the sets.

The cell module 3 includes two cell holders 30, each capable of holding half the total number of the electric cells 1 included in the cell module 3. With the cell holders 30 horizontally arranged on the module tray 32, half (four) of the electric cells 1 held by each cell holder 30 are arranged in the same column, and the predetermined number (eight) of the electric cells 1 are aligned.

The cell holder 30 integrally holds in the vertical direction the predetermined number of electric cells 1 arranged therebetween. More specifically, the cell holder 30 includes an under frame 300 that supports the electric cells 1 and an upper frame 350 that fixes the electric cells 1 supported by the under frame 300.

The under frame 300 is a resin molded product with electrical insulation properties. The under frame 300 includes: a mounting section 301 on which the predetermined number of electric cells 1 are mounted; a bottom frame section 302 that is vertically arranged at the outer periphery of the mounting section 301 and collectively surrounds the lower part of the cell cases 10 of the predetermined number of electric cells 1 arranged on the mounting section 301; a top frame section 303 that is arranged over the mounting section 301 and the bottom frame section 302 and that collectively surrounds the upper part of the cell cases 10 of the predetermined number of electric cells 1 arranged on the mounting section 301; and linkage sections 304 that link the bottom frame section 302 and the top frame section 303.

The mounting section 301 is formed so that the profile in plan view has a substantially square shape. In the present embodiment, the mounting section 301 has openings (holes) at sections other than the sections for supporting the electric cells 1 in order to lighten the under frame 300.

The mounting section 301 is sized so as to allow alignment of the predetermined number of electric cells 1 in the column direction. More specifically, the mounting section 301 is sized so as to allow alignment of the predetermined number of electric cells 1 in the column direction by forming the ventilation spaces S between the front surfaces FS of adjacent electric cells 1.

The entire perimeter at the bottom edge of the bottom frame section 302 is connected to the entire outer perimeter of the mounting section 301, and the bottom frame section 302 surrounds the area that supports the electric cells 1 in the mounting section 301. More specifically, the bottom frame section 302 surrounds the area where the predetermined number of electric cells 1 are arranged and defines an area in a substantially square shape in plan view. The top frame section 303 defines an area in the same size and the same shape as the bottom frame section 302, and each side of the top frame section 303 is arranged corresponding to each side of the bottom frame section 302.

The linkage sections 304 are formed in a longitudinal strip shape elongated in the vertical direction. The linkage sections 304 are arranged at intervals in the circumferential direction of the top frame section 303 and the bottom frame section 302, so as to link the top frame section 303 and the bottom frame section 302 at a plurality of locations in the circumferential direction. With this configuration, gas can flow in and out from between the linkage sections 304 in the under frame 300.

The cell holder 30 includes spacers 305 and 306 interposed between the electric cells 1 to arrange the predetermined number of electric cells 1 mounted on the mounting section 301 at predetermined intervals (to form the ventilation spaces S between the electric cells 1).

The spacers 305 and 306 may be formed of plates with a thickness corresponding to the ventilation spaces S formed between the electric cells 1. However, the spacers 305 and 306 according to the present embodiment are formed integrally with the under frame 300. More specifically, a plurality of spacers 305 (hereinafter referred to as "lower spacers") are arranged at intervals corresponding to the size in the depth direction of the electric cells 1 in the direction in which the electric cells 1 are aligned on the top surface of the mounting section 301.

The lower spacers 305 are formed so that the height in the vertical direction is equal to or smaller than the height in the vertical direction of the bottom frame section 302 surrounding the lower part of the cell cases 10 of the electric cells 1. The lower spacers 305 are formed in a strip shape elongated in a direction orthogonal to the vertical direction. The lower spacers 305 may be formed with a uniform thickness. However, from the view point of lightening, thick wall sections 305*a* that are formed with a thickness corresponding to size of the intervals between the electric cells 1 and thin wall sections 305*b* that are made to be thinner than the thickness of the thick wall sections 305*a* are alternately formed in a longitudinal direction (direction corresponding to the transverse direction of the cell cases 10) in the lower spacers 305.

The under frame 300 also includes the spacers 306 (hereinafter referred to as "upper spacers") for defining the ventilation spaces S between the electric cells 1 in the top frame section 303 surrounding the top of the cell cases 10 of the electric cells 1. Like the lower spacers 305, the upper spacers 306 may be formed in a plate shape. However, in the present embodiment, the upper spacers 306 are projections projecting inside from the inner surface of the top frame section 303. The upper spacers 306 are provided corresponding to the arrangement of the lower spacers 305. The thickness of the upper spacers 306 in the direction orthogonal to the projecting direction thereof corresponds to the thickness of the thick wall sections 305*a* of the lower spacers 305.

As described, the top frame section 303 and the bottom frame section 302 collectively surround the upper and lower parts of the cell cases 10 of the predetermined number of electric cells 1. In this state, the lower spacers 305 are interposed between the lower parts of the cell cases 10 of the electric cells 1, and the upper spacers 306 intervene between the upper parts of the cell cases 10 of the electric cells 1.

The upper frame 350 is a resin molded product with electrical insulation properties. The upper frame 350 can be fitted and coupled to the top edge (top frame section 303) of the under frame 300. The upper frame 350 is formed to expose outside the connection terminal 11a of one of the electric cells 1 at both ends in the column direction and the connection terminal 11b of the other electric cell 1 among the predetermined number of electric cells 1 aligned on the under frame 300, while the upper frame 350 is fitted to the top frame section 303 of the under frame 300.

More specifically, the upper frame 350 includes the frame section 351 that is formed to be able to surround the positive and negative electrode connection terminals 11a and 11b of the predetermined number of electric cells 1 and that can be linked to the upper end of the under frame 300.

The frame section 351 is configured so that it does not surround the pair of the connection terminal 11a at one of the outermost electric cells and the connection terminal 11b at the opposite one of the outermost electric cells, which are positioned in alignment, among the predetermined number of electric cells 1 aligned on the under frame 300.

Figure 10:
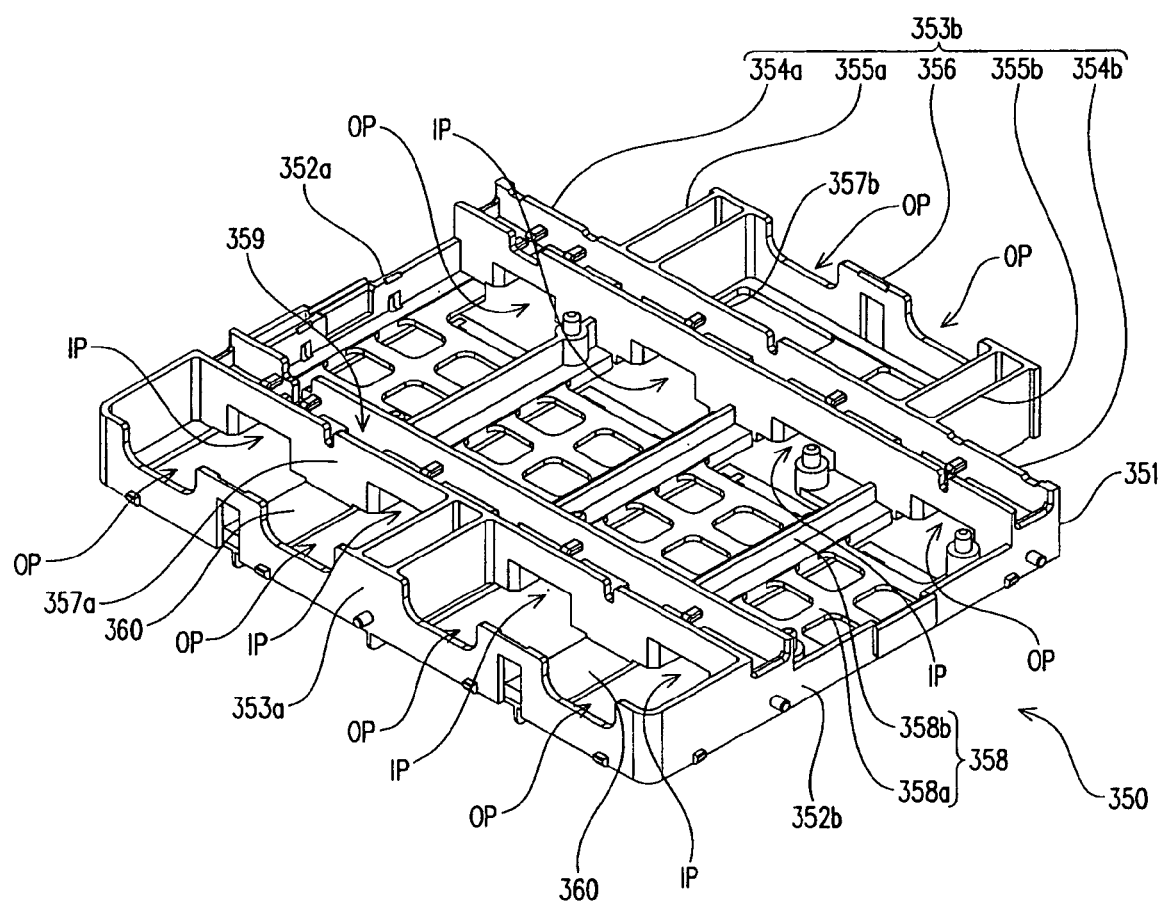
FIG. 10 is a perspective view of an upper frame constituting a cell holder.

As shown in FIG. 10, the frame section 351 includes a pair of lateral beams 352a and 352b opposing each other in the longitudinal direction, and a pair of longitudinal beams 353a and 353b connecting both sides of the pair of lateral beams 352a and 352b.

The pair of lateral beams 352a and 352b are arranged outside the outermost electric cell 1 among the predetermined number of electric cells 1 lined up in the column direction and are arranged parallel to or substantially parallel to the front surface FS of the cell case 10 of the electric cell 1. Each of the pair of lateral beams 352a and 352b is connected to the longitudinal beam 353a at one end and extends in the orthogonal direction from the longitudinal beam 353a. The lengths in the longitudinal direction of the pair of lateral beams 352a and 352b are set to be shorter than the distance from one of the side surfaces SS of the cell case 10 of the electric cell 1 to the opposite side surface SS.

The longitudinal beam 353a of the pair of longitudinal beams 353a and 353b is formed to extend straight in the direction orthogonal to the lateral beams 352a and 352b. Meanwhile, the longitudinal beam 353b includes: a pair of longitudinal extending sections 354a and 354b extending toward the mating lateral beams 352a and 352b from one of the ends in the longitudinal direction of the lateral beams 352a and 352b; a pair of lateral extending sections 355a and 355b extending in the direction orthogonal to the longitudinal extending sections 354a and 354b and toward the opposite side of the longitudinal beam 353a from the ends of the pair of longitudinal extending sections 354a and 354b; and a main beam 356 that connects the ends of the pair of lateral extending sections 355a and 355b.

The longitudinal beam 353a and the main beams 356 of the longitudinal beam 353b are arranged outside the two side surfaces SS of the electric cells 1 supported by the under frame 300 and arranged parallel to or substantially parallel to the side surfaces SS. The pair of longitudinal extending sections 354a and 354b are arranged to be parallel to or substantially parallel to the longitudinal beam 353a. The pair of lateral extending sections 355a and 355b are arranged at positions corresponding to positions between the outermost electric cells 1 in the column direction and the electric cells 1 adjacent to the outermost electric cells 1 among the predetermined number of electric cells 1 held by the cell holder 30.

With this configuration, the frame section 351 can surround the connection terminals 11a and 11b other than the connection terminals 11a and 11b on one side of the two outermost electric cells 1 in the column direction among the predetermined number of electric cells 1. More specifically, the pair of longitudinal extending sections 354a and 354b and the pair of lateral extending sections 355a and 355b are formed to surround the connection terminals 11a and 11b except the connection terminal 11a of one of the outermost electric cells 1 and the connection terminal 11b of the other of the outermost electric cells 1 among the aligned electric cells 1.

The pair of lateral beams 352a and 352b, the longitudinal beam 353a, and the main beam 356 of the longitudinal beam 353b can be fitted and coupled to the top frame section 303 of the under frame 300. In association with this, the pair of lateral beams 352a and 352b, the longitudinal beam 353a, and the main beam 356 of the longitudinal beam 353b are provided with a plurality of engagement protrusions (not numbered) at intervals in the circumferential direction for engagement to engagement sections (not numbered) formed on the top frame section 303 of the under frame 300. The longitudinal beams 353a and 353b of the frame section 351 are provided with a plurality of cover fixation engagement sections (not numbered) disposed at intervals, the sections made of recessed portions or holes (holes in the present embodiment) for engaging engagement claws (not numbered) of the cell cover 31 described below.

The upper frame 350 includes cell restriction units 357a and 357b that are arranged in an area surrounded by the frame section 351 and that restrict the movement in the vertical direction of the predetermined number of electric cells 1. The cell restriction units 357a and 357b bias the electric cells 1 supported by the under frame 300 from above, while the frame section 351 is linked to the under frame 300. The cell restriction units 357a and 357b has a beam shape extending in the direction in which the electric cells 1 are aligned. The cell restriction units 357a and 357b abut areas between the positive and negative electrode connection terminals 11a and 11b on the top surface TS of the cell 1.

One pair of the cell restriction units 357a and 357b are provided. The cell restriction units 357a and 357b are arranged at an interval in the longitudinal direction of the lateral beams 352a and 352b. Both ends of the cell restriction units 357a and 357b are connected to the frame section 351. Both ends of the cell restriction unit 357a are connected to the pair of lateral beams 352a and 352b, and both ends of the cell restriction unit 357b are connected to the ends of the longitudinal extending sections 354a and 354b (base ends of the lateral extending sections 355a and 355b) of the longitudinal beam 353b. Thus, the cell restriction unit 357b is continuous with the longitudinal extending sections 354a and 354b to integrally form one beam, and the longitudinal extending sections 354a and 354b function as the cell restriction unit 357b that restricts the movement of the electric cells 1.

The pair of cell restriction units 357a and 357b are arranged so that the upper ends are flush with each other. The pair of cell restriction units 357a and 357b are arranged so that the upper ends are flush with the upper end of the frame section 351. Therefore, the upper end of the frame section 351 and the upper ends of the pair of cell restriction units 357a and 357b are set to be positioned at the same height level.

The pair of cell restriction units 357a and 357b are arranged to be positioned between the positive electrode connection terminals 11a and the negative electrode connection terminals 11b of the electric cells 1 supported by the under frame 300. The pair of cell restriction units 357a and 357b press the top surfaces TS of the cell cases 10 between the positive electrode connection terminals 11a and the negative electrode connection terminals 11b and restrict the movement of the electric cells 1.

Outside ventilation openings OP extending through the frame section 351 in the direction orthogonal to the vertical direction are formed at such positions that they oppose outside ventilation openings OP of an adjacent frame section 351. Inside ventilation openings IP are formed extending through the battery restriction units 357a and 357b in the direction orthogonal to the vertical direction.

The outside ventilation openings OP and the inside ventilation openings IP are formed corresponding to the arrangement of the predetermined number of electric cells 1 supported by the under frame 300. More specifically, a plurality of outside ventilation openings OP are formed on the pair of longitudinal beams 353a and 353b corresponding to the arrangement of the electric cells 1, and a plurality of inside ventilation openings IP are formed on the pair of cell restriction units 357a and 357b corresponding to the arrangement of the electric cells 1. In this manner, the outside ventilation openings OP are arranged in alignment in each electric cell 1, and the inside ventilation openings IP are also arranged in alignment in each electric cell 1.

The outside ventilation openings OP are formed in the upper ends of the longitudinal beams 353a and 353b. Meanwhile, the inside ventilation openings IP are formed in the lower ends of the cell restriction units 357a and 357b. More specifically, the outside ventilation openings OP are formed in a cutout shape that is opened upward, and the inside ventilation openings IP are formed in a cutout shape that is opened downward.

The cell restriction units 357a and 357b need to press the top surfaces TS of the electric cells 1. For this purpose, the inside ventilation openings IP are formed corresponding to center sections in the depth direction of the top surfaces TS of the electric cells 1, and both sides of the inside ventilation openings IP press both ends in the depth direction of the cell cases 10. Like the inside ventilation openings IP formed on the cell restriction unit 357b, the outside ventilation openings OP formed on the longitudinal extending sections 354a and 354b of the longitudinal beam 353b are formed in a cutout shape opened downward.

In the area surrounded by the frame section 351 in the upper frame 350, a circuit board CB for electrically monitoring the electric cells 1 is arranged (cf., FIG. 9). In association with this, the upper frame 350 includes a board support section 358 that allows the circuit board CB to be arranged between the positive electrode connection terminals 11a and the negative electrode connection terminals 11b of the electric cell 1 surrounded by the frame section 351. The board support section 358 is directly or indirectly linked to the frame section 351. The board support section 358 is arranged between the pair of cell restriction units 357a and 357b and is linked to the cell restriction units 357a and 357b and the lateral beams 352a and 352b.

The board support section 358 includes a support main body 358a formed in a lattice pattern with a plurality of vertical through-openings and reinforcing ribs 358b vertically arranged on the support main body 358a. The circuit board CB is arranged on the reinforcing rib 358b.

The board support section 358 is arranged not to be positioned below the lower ends of the pair of cell restriction units 357a and 357b. More specifically, the board support section 358 is arranged not to come in contact with the top surfaces TS of the cell cases 10 of the electric cells 1 (cf., FIG. 7). This allows the board support section 358 to support the circuit board CB at such a position as to have less thermal effect from the electric cells 1.

A groove 359, which is opened on the top surfaces of the cell restriction units 357a and 357b, is continuously formed in the longitudinal direction on at least one of the pair of cell restriction units 357a and 357b. As shown in FIG. 7, a lead wire (lead wire that connects the circuit board CB and a control apparatus C described later) L that is connected to the circuit board CB arranged on the board support section 358 is wired in the groove 359.

As shown in FIG. 9, the module tray 32 is formed by applying sheet metal processing to a plate material. The module tray 32 includes a tray main body 320 on which the cell holders 30 are mounted and holder restriction sections 321 vertically arranged at the outer perimeter of the tray main body 320. The tray main body 320 is in a square shape in plan view and is in a size that allows two or more cell holders 30 to be aligned and arranged. Since the cell module 3 includes two cell holders 30 in the present embodiment, the tray main body 320 is sized so as to allow two cell holders 30 to be aligned and arranged.

The holder restriction sections 321 are formed by extended portions of the tray main body 320 that are extended from its sides (four sides) constituting the profile thereof and bent to extend vertically. In this way, when the cell holders 30 are arranged on the tray main body 320 of the module tray 32, the cell holders 30 are restricted from moving in the surface direction of the tray main body 320 by interference with the holder restriction sections 321. The module tray 32 that integrally supports the two cell holders 30 can be engaged to a tray 20 of the packaging case 2 described later.

In the predetermined number of electric cells 1 held by the cell holder 30, the positive electrode connection terminals 11a and the negative electrode connection terminals 11b are connected by bus bars B. More specifically, the upper frame 350 includes reinforcing beams 360 that connect the longitudinal beams 353a and the cell restriction units 357a. The reinforcing beams 360 are arranged at positions corresponding to positions between the aligned electric cells 1. Therefore, the frame sections 351 of the upper frames 350 are engaged to the top frame sections 303 of the under frames 300 that support the electric cells 1, and then the bus bars B arranged across the reinforcing beams 360 electrically connect the positive electrode connection terminals 11a and the negative electrode connection terminals 11b of adjacent electric cells 1.

A bus bar B arranged across two cell holders 30 electrically connect the positive electrode connection terminal 11a of the electric cell 1 in one of the cell holders 30 and the negative electrode connection terminal 11b of the electric cell 1 of the other cell holder 30. With this configuration, the electric cells 1 held by the two cell holders 30 are electrically integrated to form a high-capacity assembled battery. The positive electrode connection terminal 11a of one of the two outermost electric cells 1 and the negative electrode connection terminal 11b of the other of the outermost electric cells 1 among the predetermined number of electric cells 1 aligned in the column direction serve as the connection terminals of the assembled battery.

The cell cover 31 is a resin molded product with electrical insulation properties. The cell cover 31 is arranged on the upper frames 350 of the cell holders 30 to cover the top surfaces of the predetermined number of electric cells 1. Two cell holders 30 are aligned in the present embodiment, and therefore the cell cover 31 integrally covers the entire upper areas of the two aligned cell holders 30.

The cell cover 31 is arranged across two cell holders 30 and is formed in a substantially square shape (rectangular shape) in plan view. Corners of the cell cover 31 are cut out to expose to the outside the positive electrode connection terminal 11a and the negative electrode connection terminal 11b included in the predetermined number of electric cells 1.

The cell cover 31 includes terminal exposure sections 310 in a cutout shape at both corners on one end in the direction orthogonal to the longitudinal direction. The terminal exposure sections 310 are formed corresponding to the square areas defined by longitudinal extending sections 354a and 354b and the lateral extending sections 355a and 355b of the upper frame 350, respectively, serving as two sides. A plurality of engagement claws (not numbered) are projected at intervals in the circumferential direction on the outer peripheral edges of the cell cover 31. The engagement claw can be engaged to the corresponding cover fixation engagement sections among a plurality of cover fixation engagement section (not numbered) formed on the frame section 351.

The cell cover 31 is provided with a plurality of gas guidance sections 311 corresponding to the arrangement of the inside ventilation openings IP. The gas guidance sections 311 are sloped downward toward the cell restriction units 357a and 357b.

The gas guidance sections 311 are formed at positions corresponding to both sides of the pair of cell restriction units 357a and 357b on one of the surfaces of the cell cover 31 (surface opposing the electric cells 1). The gas guidance sections 311 are formed to project downward from one of the surfaces of the cell cover 31 (surface opposing the electric cells 1). The gas guidance sections 311 are formed by partially expanding the cell cover 31.

As shown in FIG. 7, the gas guidance sections 311 are arranged to be adjacent with the cell restriction unit 357a or the cell restriction unit 357b. An end E1 of each gas guidance section 311 on the downward side is arranged corresponding to an end E2 of the upper wall that defines the inside ventilation opening IP of the cell restriction units 357a and 357b, or the end E1 is positioned above the end E2.

As shown in FIG. 11, the cell module 3 includes a pair of terminal covers 33 that cover the positive electrode connection terminal 11a and the negative electrode connection terminal 11b of the assembled battery.

Figure 12:
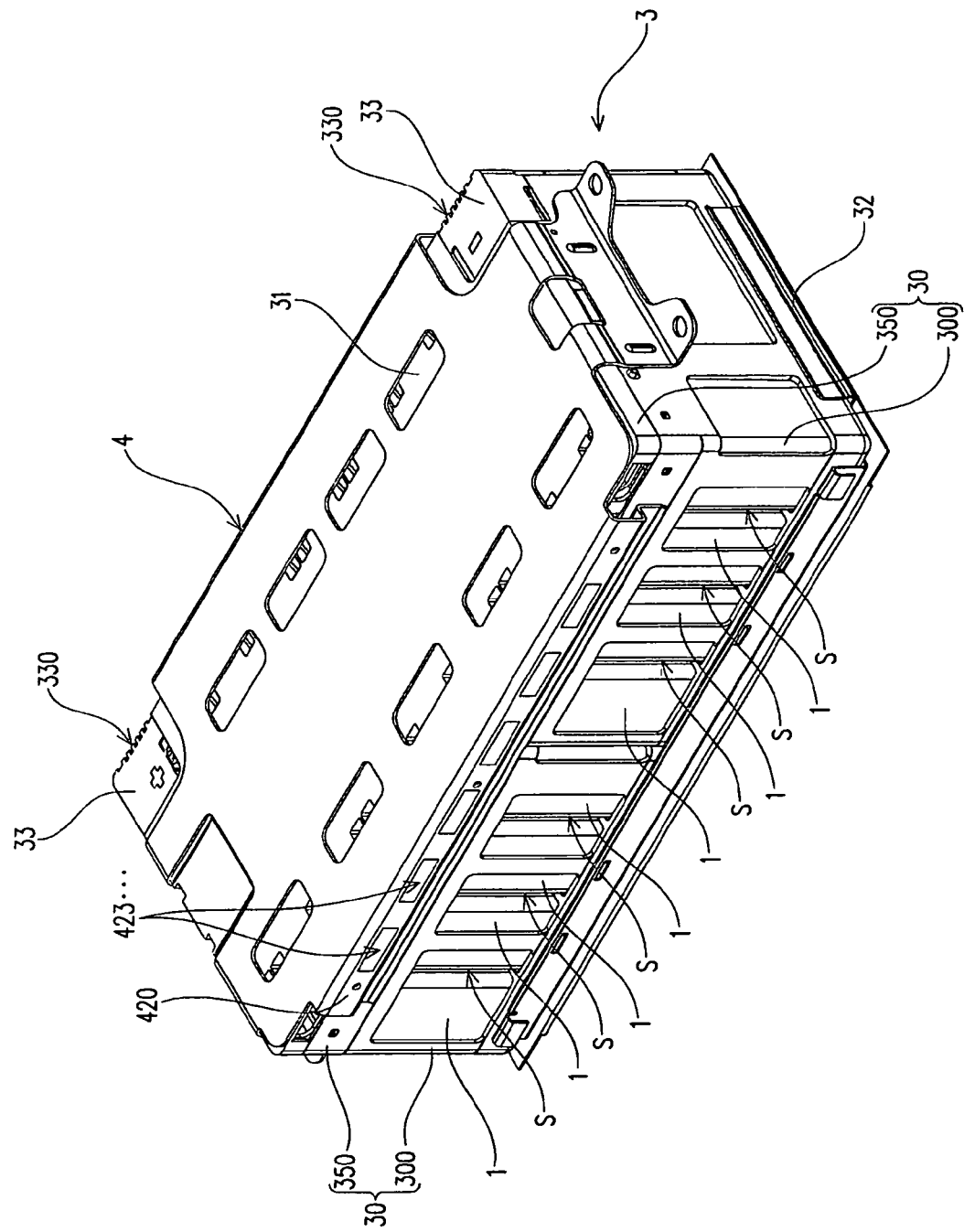
FIG. 12 is a perspective view showing a state in which the module fixation member is arranged on the cell module according to the embodiment.

As shown in FIG. 12, the terminal cover 33 can be linked to the upper frame 350. The terminal cover 33 includes a cover ventilation section 330. The cover ventilation section 330 opposes and communicates with the outside ventilation openings OP of the frame section 351 of the adjacent cell module 3.

Figure 13:
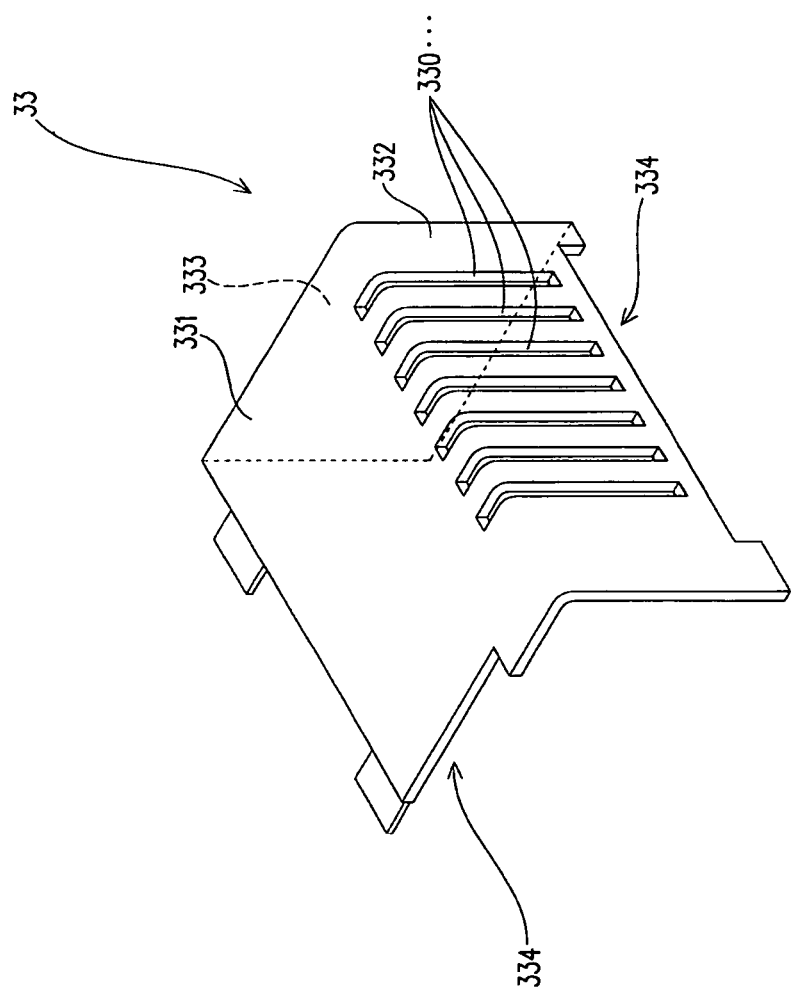
FIG. 13 is a perspective view of the terminal cover according to the embodiment.

As shown in FIG. 13, the terminal cover 33 includes a top plate 331 in a substantially square shape in plan view positioned above the connection terminals 11a and 11b, a longitudinal side wall 332 suspending from one end in one direction of the top plate 331, and a lateral side wall 333 that suspends from one end in another direction orthogonal to the one direction of the top plate 331 and that is connected to the adjacent longitudinal side wall 332. The longitudinal side wall 332 opposes the longitudinal extending sections 354a and 354b of the longitudinal beam 353b, and the lateral side wall 333 opposes the lateral extending sections 355a and 355b.

The cover ventilation sections 330 are formed in the longitudinal side wall 332. More specifically, the cover ventilation section 330 is formed on the longitudinal side wall 332 opposing the longitudinal beam 353a in which the outside ventilation openings OP are formed. The cover ventilation sections 330 are composed of a plurality of strips of slits communicating inside and outside.

The lower end of the lateral side wall 333 and the lower end of the longitudinal side 332 are slightly cut out to form bus bar insertion sections 334. The strip-shaped bus bars B are inserted inside and outside the terminal cover 33 through the bus bar insertion sections 334 to bridge adjacent cell modules 3 to connect the connection terminals 11a and 11b.

Attachment claws (not shown) that can be engaged and released from the frame section 351 of the upper frame 350 are provided at the other end in the one direction of the top plate 331. This can maintain a state in which the terminal covers 33 cover the positive electrode connection terminals 11a and the negative electrode connection terminals 11b of the assembled battery.

Figure 14:
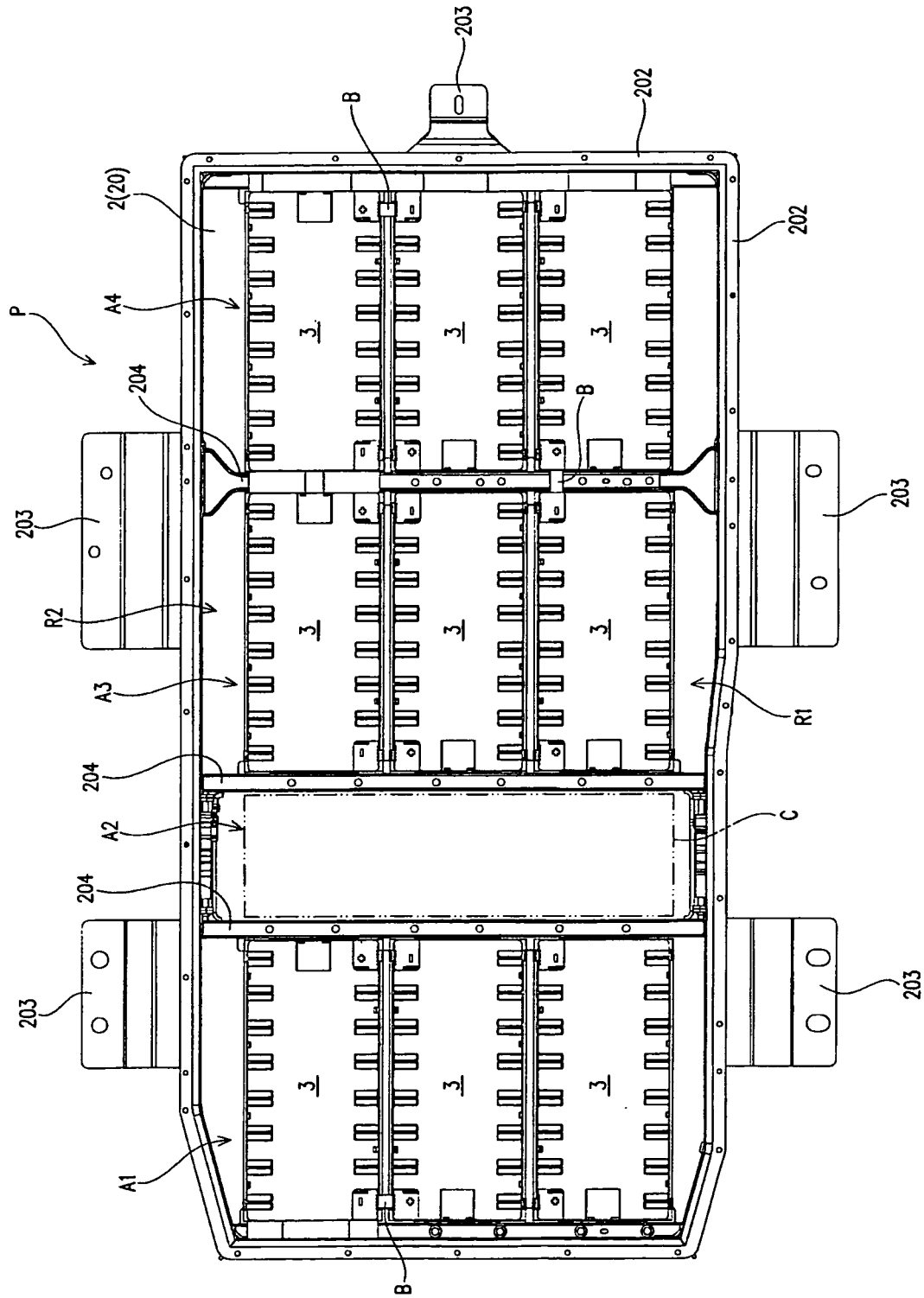
FIG. 14 is a plan view showing a state in which the cell modules according to the embodiment are arranged in a packaging case from which the cover of the packaging case and the module fixation members are removed.
Figure 15:
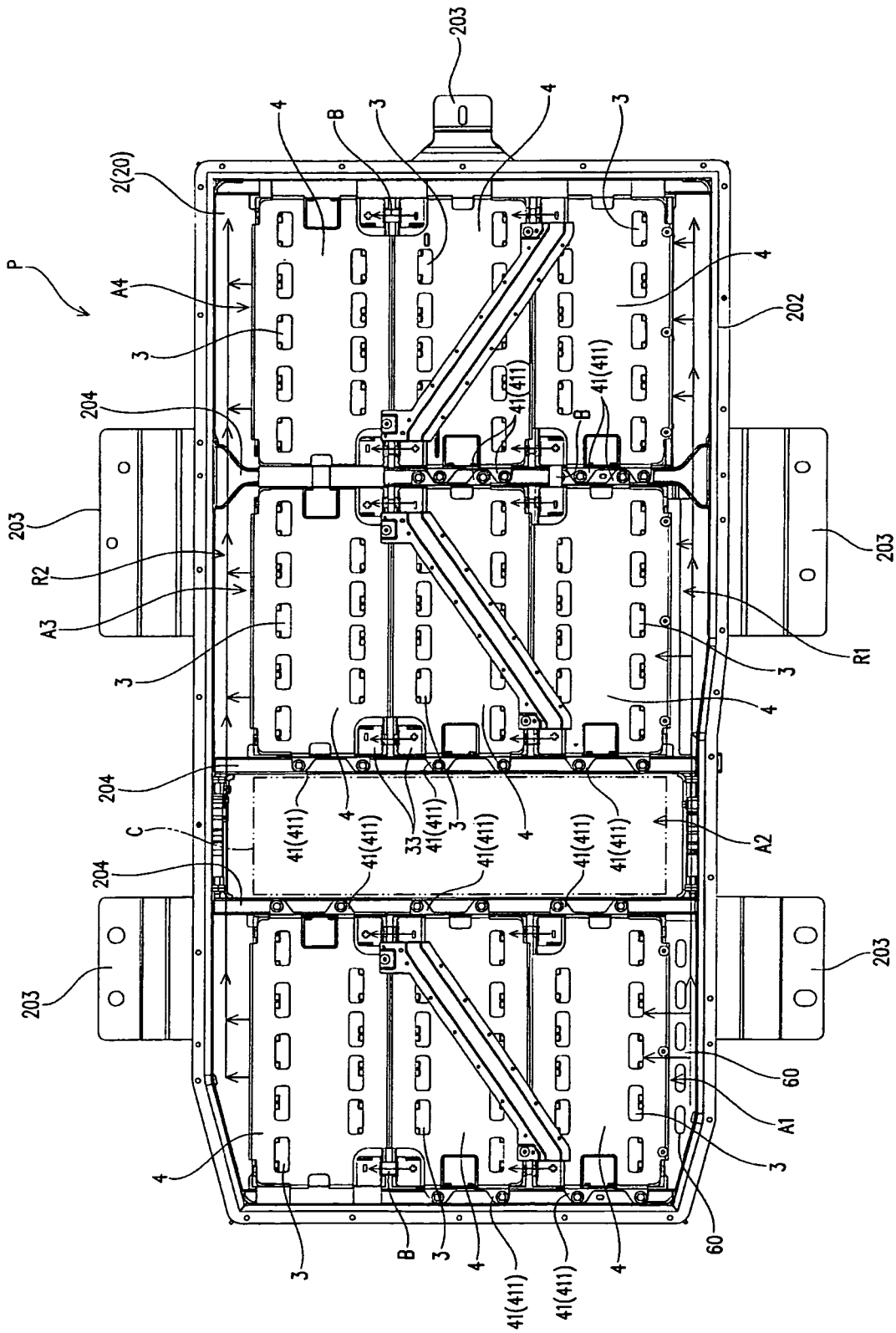
FIG. 15 is a plan view showing a state in which the cell modules according to the embodiment are arranged in the packaging case and fixed by the module fixation members.

The cell modules 3 according to the present embodiment have the foregoing configurations. As shown in FIG. 14, the cell modules 3 are arranged in multiple rows and multiple columns in the packaging case 2 and are fixed to the packaging case 2. In association with this, the battery pack P according to the present embodiment include module fixation members 4 for fixing the cell modules 3 arranged in the packaging case 2 as shown in FIG. 15. The module fixation members 4 hold the cell modules 3 arranged in the packaging case 2 from above to fix the cell modules 3 in the packaging case 2.

The module fixation member 4 is provided for each cell module 3. As shown in FIG. 11, the module fixation member 4 includes a plate-shaped fixation member main body 40 arranged on the cell cover 31 of the cell module 3, linkage sections 41 (hereinafter referred to as "case linkage sections") connected to the fixation member main body 40 and linked to the packaging case 2, and a pair of suspending walls 42 that suspend from both sides of the fixation member main body 40 so as to face the frame sections 351 in the row direction of the plurality of electric cells 1.

Like the cell cover 31, corners of the fixation member main body 40 are cut out in accordance with the arrangement of the positive electrode connection terminal 11a and the negative electrode connection terminal 11b of the assembled battery. More specifically, the fixation member main body 40 includes cutout-shaped terminal exposure sections 400 on both corners of one end in the direction orthogonal to the longitudinal direction. The size of the fixation member main body 40 in the direction orthogonal to the longitudinal direction is set to be greater than the size in the transverse direction of the cell module 3.

Each of the case linkage sections 41 includes a first suspending piece 410 suspending from an end in the longitudinal direction of the fixation member main body 40 and a fixation piece 411 extending outside from the bottom end of the first suspending piece 410. Through-holes for insertion of screw members (for example, bolts) for linkage are formed in the fixation piece 411. The base end of the first suspending piece 410 is formed to expand outside. The case linkage section 41 is flexible and is capable of mitigating impacts, etc., when there is a vibration, etc., caused by an external factor.

Each of the suspending walls 42 includes a second suspending piece 420 suspending from a side extending in the longitudinal direction of the fixation member main body 40, a folded piece 421 extending inward from the bottom end of the second suspending piece 420, and an abutment piece 422 suspending from the end of the folded piece 421. A plurality of ventilation openings 423 (square openings in the present embodiment) are formed on the second suspending piece 420. Through-holes (not numbered) for insertion of fixation bolts are formed on the second suspending piece 420. The through-holes are formed between the ventilation openings 423.

As shown in FIG. 7, the pair of second suspending pieces 420 face the frame section 351 of the cell module 3 at intervals. The pair of abutment pieces 422 abut both sides of the cell module 3 in the row direction. As shown in FIG. 8, the pair of first suspending pieces 410 abut both sides of the cell module 3 in the column direction.

Figure 16:
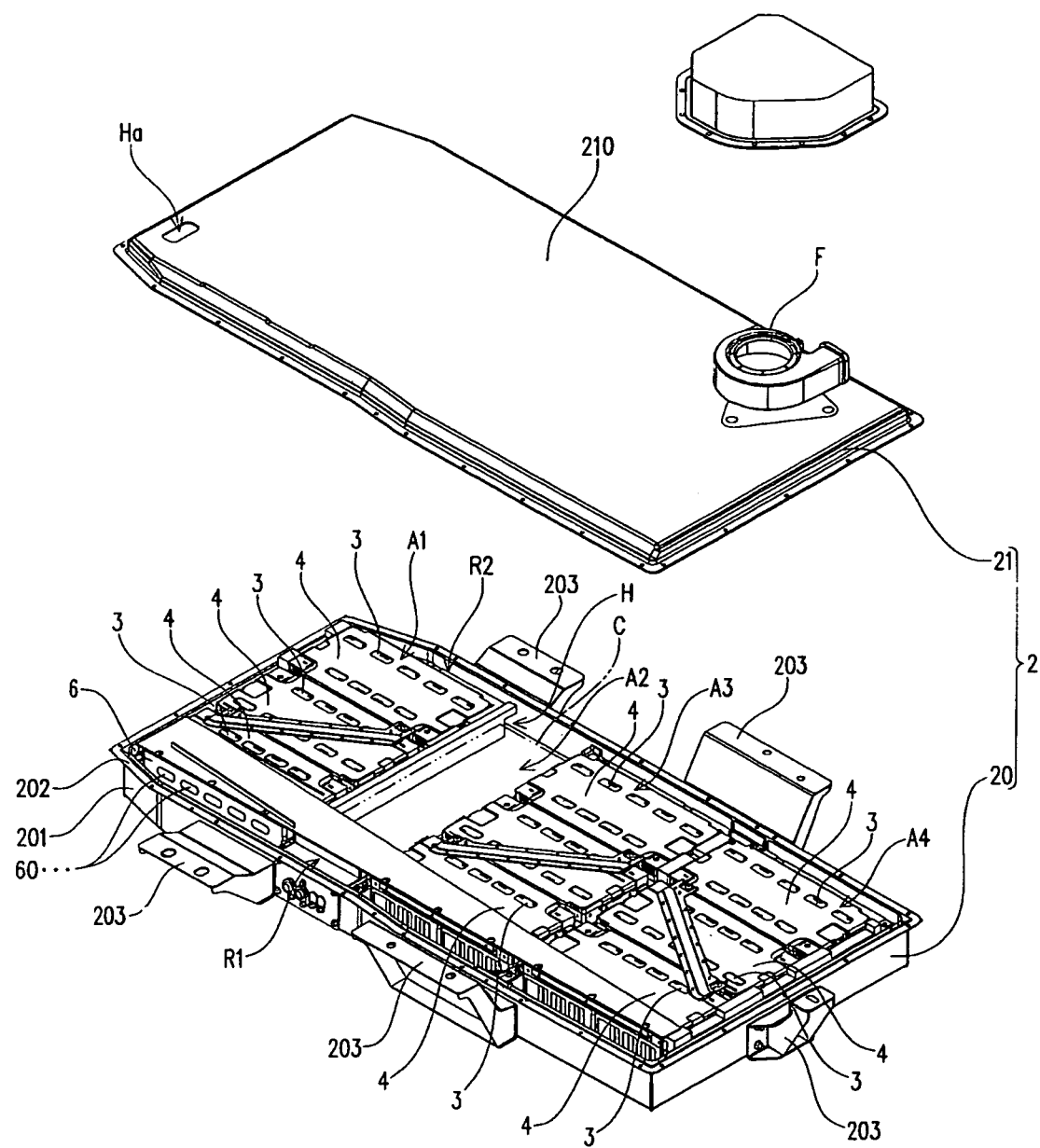
FIG. 16 is a perspective view showing a state in which the cell modules according to the embodiment are arranged in the packaging case and fixed by the module fixation members, and the cover of the packaging case is removed according to the embodiment.

As shown in FIGS. 15 and 16, the pair of case linkage sections 41 are linked to separation sections 204 of the packaging case 2 described below through screw members inserted to the through-holes. The suspending wall 42 is linked by a screw member to the suspending wall 42 of the adjacent module fixation member 4. While the suspending walls 42 of adjacent module fixation members 4 are linked, the ventilation openings 423 of one of the module fixation members 4 communicate with the ventilation openings 423 of the other module fixation member 4 (cf., FIGS. 4 and 5).

As shown in FIG. 16, the packaging case 2 includes the tray 20 on which the plurality of electric cells 1 are arranged and a cover 21 that covers the electric cells 1 on the tray 20, i.e., the upper sections of the tray 20.

Figure 4:
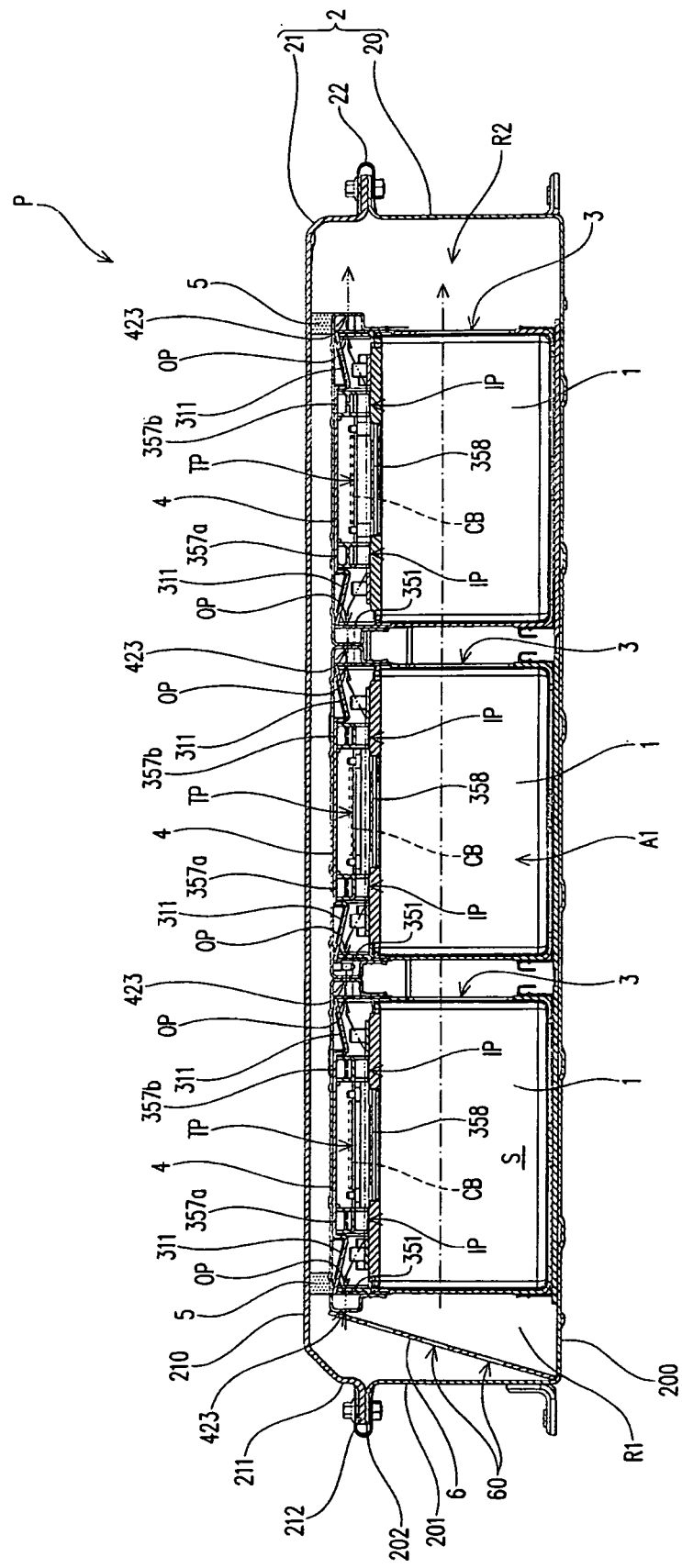
FIG. 4 is a vertical cross-sectional view of the battery pack according to the embodiment taken along lines II-II of FIG. 1, in which link arms are not shown.
Figure 5:
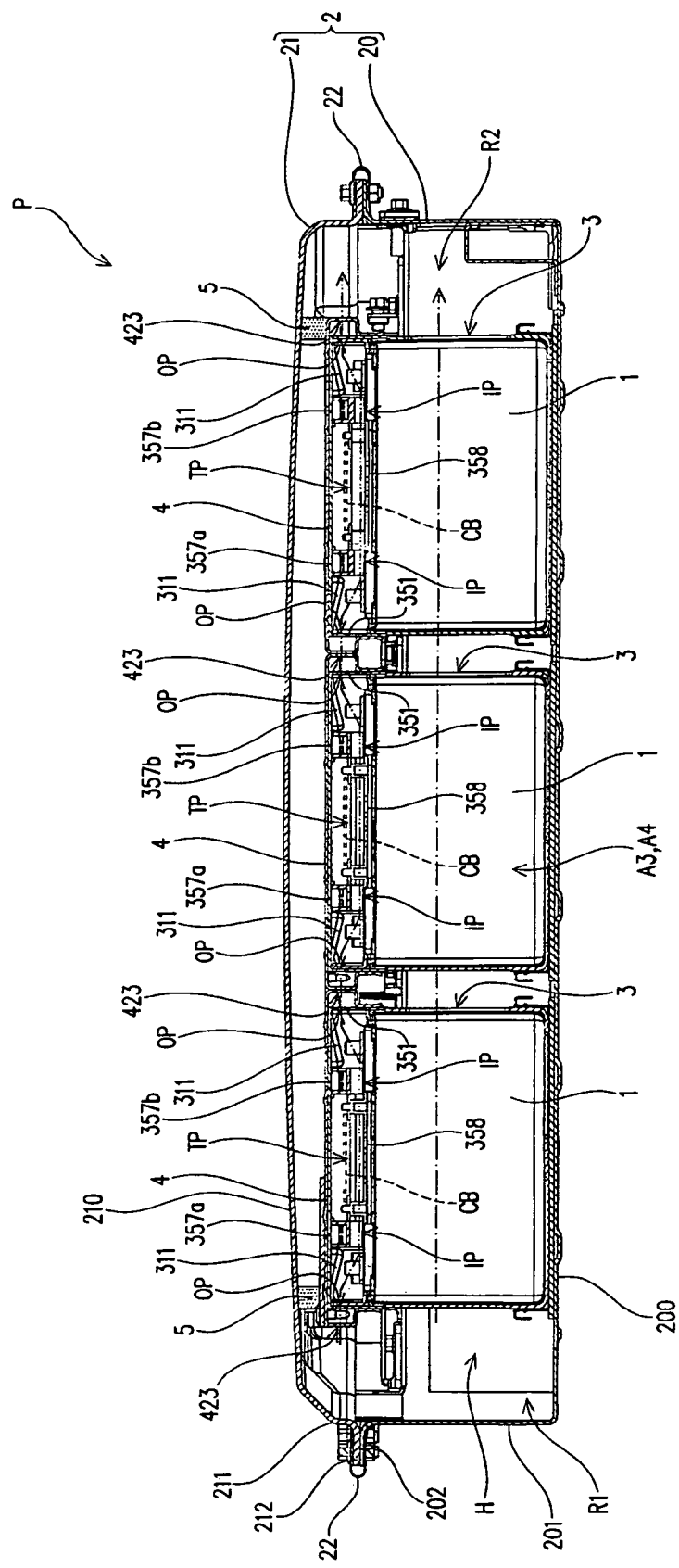
FIG. 5 is a vertical cross-sectional view of the battery pack according to the embodiment taken along lines of FIG. 1, in which link arms are not shown.

As shown in FIGS. 4 and 5, the tray 20 includes a bottom section 200 on which the plurality of electric cells 1 are arranged and a lower flanged portion 202 that is directly or indirectly connected to the outer perimeter of the bottom section 200 and that forms an annular shape outside the bottom section 200. More specifically, the tray 20 includes the bottom section 200, a lower circumferential wall 201 rising from the outer perimeter of the bottom section 200, and the lower flanged portion 202 extending outside from the upper end of the lower circumferential wall 201.

The bottom section 200 is formed in a substantially rectangular shape in plan view. In association with this, the lower circumferential wall 201 is formed in a rectangular frame shape to define an area of a rectangular shape in plan view corresponding to the plane shape of the bottom section 200. Link arms 203 for linking with chassis (not shown) of an electrically powered vehicle protrude at a plurality of locations (five locations in the present embodiment) on the outer surface of the lower circumferential wall 201 (cf., FIG. 1, etc.).

As shown in FIGS. 3, 14, and 15, the area surrounded by the lower circumferential wall 201 is divided into a plurality of (four in the drawings) areas A1, A2, A3, and A4 in the longitudinal direction of the bottom section 200. Therefore, the tray 20 is provided with a plurality of separation sections 204 at intervals in the longitudinal direction of the bottom section 200. In the following description, the four areas divided by the separation sections 204 will be referred to as a first area A1, a second area A2, a third area A3, and a fourth area A4 in the order from one end to the other end in the longitudinal direction of the bottom section 200 of the tray 20.

Each of the plurality of separation sections 204 is linked to a pair of opposing wall surfaces (not numbered) of the lower circumferential wall 201.

The control apparatus (control boards) C that controls loading, etc., of the cell module 3 is arranged on one of the first area A1, the second area A2, the third area A3, and the fourth area A4 (the second area A2 in the present embodiment). The cell modules 3 are arranged on the rest of the areas (the first area A1, the third area A3, and the fourth area A4 in the present embodiment).

A plurality of sets (three sets in the present embodiment) of cell modules 3 are aligned and arranged in the row direction on each of the first area A1, the third area A3, and the fourth area A4. As a result, the plurality of cell modules 3 are arranged in multiple rows and multiple columns on the entire tray 20. More specifically, the cell modules 3 area arranged in each of the first area A1, the third area A3, and the fourth area A4 so that the predetermined number of electric cells 1 held by the cell holders 30 are lined up in the column direction, and the electric cells 1 of adjacent cell modules 3 are aligned in the row direction. In this manner, the ventilation spaces S formed between the electric cells 1 are aligned in the row direction so as to provide straight passages.

Connectors (not numbered) for connecting cables for supplying power from the cell modules 3 to a driving motor or a control system of the electrically powered vehicle and connectors (not numbered) for connecting cables, etc., for signal transmission of information (such as a charge state) related to the entire cell modules 3 and the electric cells 1 are attached to the lower circumferential wall 201.

As shown in FIGS. 4 and 5, the lower flanged portion 202 extends outward from the perimeter of the top end of the lower circumferential wall 201. The lower flanged portion 202 has an endless annular shape (cf., FIG. 14). The lower flanged portion 202 has a rectangular frame shape in plan view.

The cover 21 includes a top portion 210 opposing the bottom section 200 of the tray 20 and an upper flanged portion 212 that is directly or indirectly connected to the outer perimeter of the top portion 210 and that is in an annular shape outside the top portion 210. More specifically, the cover 21 includes the top portion 210 corresponding to the open section of the tray 20, the upper circumferential wall 211 suspending from the outer periphery of the top portion 210, and the upper flanged portion 212 extending outward from the bottom edge of the upper circumferential wall 211.

The top portion 210 is formed in a substantially rectangular shape in plan view corresponding to the open section of the tray 20. The upper flanged portion 212 extends outward from the perimeter of the bottom edge of the upper circumferential wall 211. Like the lower flanged portion 202, the upper flanged portion 212 has an endless annular shape and abuts the lower flanged portion 202 when the cover 21 covers the top opening of the tray 20.

Based on the fact that the packaging case 2 includes the tray 20 provided with the lower flanged portion 202 and the cover 21 provided with the upper flanged portion 212, the battery pack P further includes an edge cover 22 that covers from outside the entire perimeter or substantially the entire perimeter of the abutted lower flanged portion 202 and the upper flanged portion 212. In the present embodiment, with the entire perimeter or substantially the entire perimeter of the overlapped lower flanged portion 202 and the upper flanged portion 212 covered by the edge cover 22, the lower flanged portion 202, the upper flanged portion 212, and the edge cover 22 are integrally fastened with screws. Because the edge cover 22 covers the abutted lower flanged portion 202 and the upper flanged portion 212, even if liquid, such as rain water or rinse water, is attached to the outer surface of the packaging case 2, the edge cover 22 prevents the liquid from entering between the lower flanged portion 202 and the upper flanged portion 212. In the present embodiment, a sealing member is interposed between the lower flanged portion 202 and the upper flanged portion 212. With this, infiltration of the liquid into the packaging case 2 can be more reliably prevented.

The battery pack P can release heat generated by electrical charge and discharge of the cell modules 3 to prevent an excessive temperature rise of the electric cells 1. More specifically, the battery pack P creates a flow of gas in the packaging case 2 to cool the electric cells 1 by the flow of the gas.

As shown in FIG. 16, the battery pack P includes a cooling fan F. The gas flows to the areas in the packaging case 2 (the first area A1, the third area A3, and the fourth area A4 in the present embodiment), on which the electric cells 1 are arranged, as a result of blast or suction (suction in the present embodiment) by the cooling fan F. As a result, the electric cells 1 are cooled.

More specifically, as shown in FIG. 3, a pair of passages R1 and R2 that extend in the column direction to communicate with the ventilation spaces S are formed on both sides of the array of the plurality of electric cells 1 (the plurality of cell modules 3) in the packaging case 2. The gas enters from one end in the longitudinal direction of the passage R1 (hereinafter referred to as "first passage") and is discharged to the outside from the passage R2 (hereinafter referred to as "second passage") R2.

More specifically, the first passage R1 formed to introduce gas into the first area A1, the third area A3, and the fourth area A4 and the second passage R2 formed to discharge the gas passed through the first area A1, the third area A3, and the fourth area A4 to the outside are formed inside the packaging case 2.

As shown in FIGS. 4 and 5, the first passage R1 and the second passage R2 are provided adjacent to both sides of the array of the plurality of electric cells 1 (the cell modules 3) arranged in the packaging case 2. More specifically, the first passage R1 and the second passage R2 are formed on both sides of the first area A1, the third area A3, and the fourth area A4.

The first passage R1 is formed to extend in the direction in which the first area A1, the second area A2, the third area A3, and the fourth area A4 are aligned in one of the areas on both sides of the first area A1, the second area A2, the third area A3, and the fourth area A4.

The second passage R2 is formed to extend in the direction of alignment of the first area A1, the second area A2, the third area A3, and the fourth area A4 in the other area of the areas on both sides of the first area A1, the second area A2, the third area A3, and the fourth area A4.

In the present embodiment, the lower circumferential wall 201 of the tray 20 and the outer surfaces of the cell modules 3 opposing the inner wall surface of the lower circumferential wall 201 define the first passage R1 and the second passage R2. Since the control apparatus C is arranged in the second area A2 in the present embodiment, the control apparatus C and the lower circumferential wall 201 of the tray 20 define the first passage R1 and the second passage R2 in the area A2.

Vent holes H oriented in the longitudinal direction of the bottom section 200 are formed at both ends of each of the separation sections 204 of the packaging case 2 to make each of the first passage R1 and the second passage R2 continuous from the first area A1 to the fourth area A4 (cf., FIG. 5).

The gas is taken in from one end (located in the first area A1) of the first passage R1 in the longitudinal direction of the bottom section 200 of the tray 20 and is discharged from the other end (located in the fourth area A4) of the second passage R2 in the longitudinal direction of the bottom section 200 of the tray 20.

In association with this, as shown in FIGS. 1 and 16, an air intake opening Ha is formed on one end (located in the first area A1) in the longitudinal direction of the top portion 210 of the cover 21 at a position corresponding to the position of the first passage R1. An exhaust opening (not shown) is formed on the other end (located in the fourth area A4) in the same direction at a position corresponding to the position of the second passage R2. More specifically, the air intake opening Ha and the exhaust opening are positioned diagonally on the top portion 210 formed in a rectangular shape.

In the present embodiment, the cooling fan F is a suction blower and is attached to the exhaust opening of the cover 21. Air is sucked into the second passage R2 from the exhaust opening when the cooling fan F is driven, and the pressure of the second passage R2, the first area A1, the second area A2, the third area A3, the fourth area A4, and the first passage R1 becomes negative. As a result, outside air enters the first passage R1 from the air intake opening. The air passes through the first area A1, the second area A2, the third area A3, the fourth area A4, and the second passage R2, and the cooling fan F discharges the air to the outside from the exhaust opening.

The first passage R1 is a long passage formed along the first area A1, the second area A2, the third area A3, and the fourth area A4. The first passage R1 is designed to taken in outside air from one end (located in the first area A1) in the longitudinal direction of the bottom section 200 of the tray 20. Therefore, although the outside air that entered from the outside easily enters the first area A1, the air does not easily reach areas away from the first area A1 (the third area A3 and the fourth area A4). More specifically, if the first passage R1 is formed as a long passage, the gas does not easily flow into the downstream of the first passage R1 due to the pressure loss in the first passage R1. Therefore, the distribution balance of the gas to the first area A1, the third area A3, and the fourth area A4 collapses, and the cooling states of the electric cells 1 arranged in the areas become different.

To overcome this drawback, in the battery pack P, a measure is taken to supply the gas in a balanced manner from the first passage R1 to the first area A1, the third area A3, and the fourth area A4.

More specifically, the cross-sectional area of the passage in upstream areas of the first passage R1 is smaller than the cross-sectional area of the passage in downstream. Thus, the cross-sectional areas of the passage in the first area A1 and the second area A2 are smaller than the cross-sectional areas of the passage in the third area A3 and the fourth area A4 in the first passage R1.

As shown in FIGS. 3, 14, and 15, the sites of the lower circumferential wall 201 of the tray 20 corresponding to the first area A1 and the second area A2 are located at positions inward of the sites of the lower circumferential wall 201 of the tray 20 corresponding to the third area A3 and the fourth area A4. Therefore, the widths of the areas of the first passage R1 corresponding to the first area A1 and the second area A2 are narrower than the widths of the areas of the first passage R1 corresponding to the third area A3 and the fourth area A4.

Figure 6:
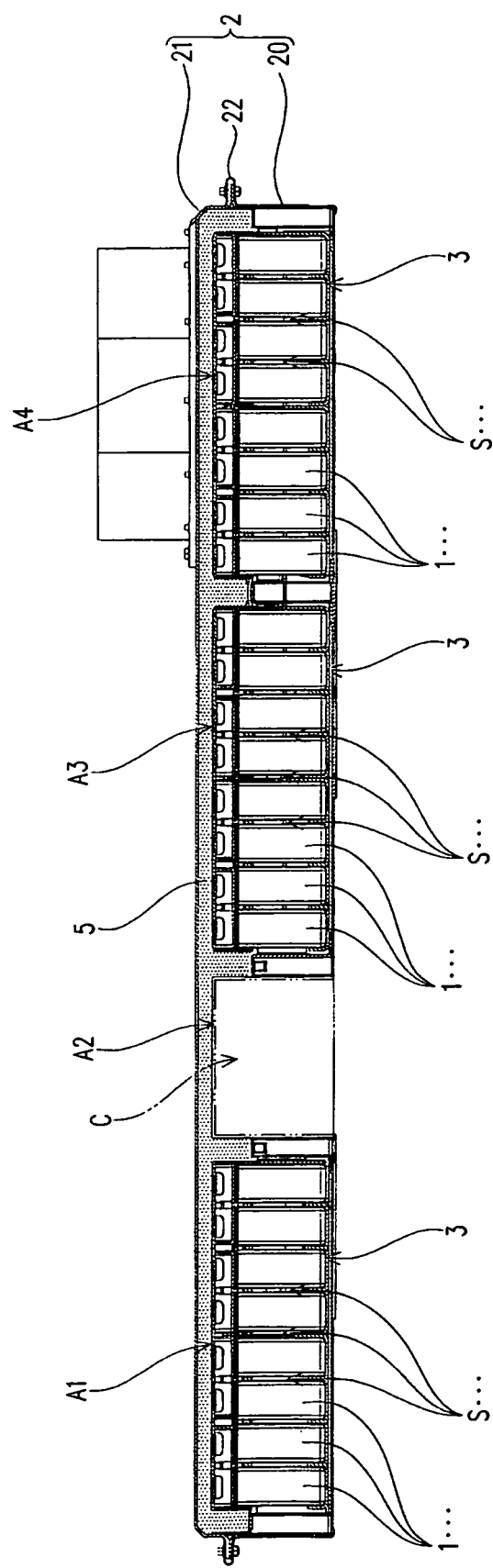
FIG. 6 is a vertical cross-sectional view of the battery pack according to the embodiment taken along lines IV-IV of FIG. 1, in which link arms are not shown.

As shown in FIGS. 4 to 6, sealing members 5 that blocks the space formed between the electric cells 1 (cell modules 3) and the cover 21 is provided between the electric cells 1 (cell modules 3) and the cover 21. More specifically, to prevent short circuits, etc., of the electric cells 1, the top portion 210 of the cover 21 is prevented from causing interference with the electric cells 1 when the electric cells 1 are covered by the cover 21.

If the space between the electric cells 1 and the cover 21 is left open, the gas flowing through the first passage R1 flows through the space into the second passage R2. In the present embodiment, therefore, the sealing member 5 is provided for the space to block the space. Any material that can close the space may be appropriately adopted as the sealing member 5. However, a sponge is adopted as the sealing member 5 in the present embodiment to prevent excessive pressure from being applied onto the cell modules 3, etc., when the cover 21 covers the cell modules 3.

As a result, the flow rate of the gas increases in the upstream areas of the first passage R1 (areas corresponding to the first area A1 and the second area A2), and the gas is swiftly sent into the downstream areas of the first passage R1 (areas corresponding to the third area A3 and the fourth area A4). In this manner, the feed rate of the gas to the third area A3 and the fourth area A4 can be made close to or equivalent to the feed rate at which the gas is sent to the first area A1.

Figure 17:
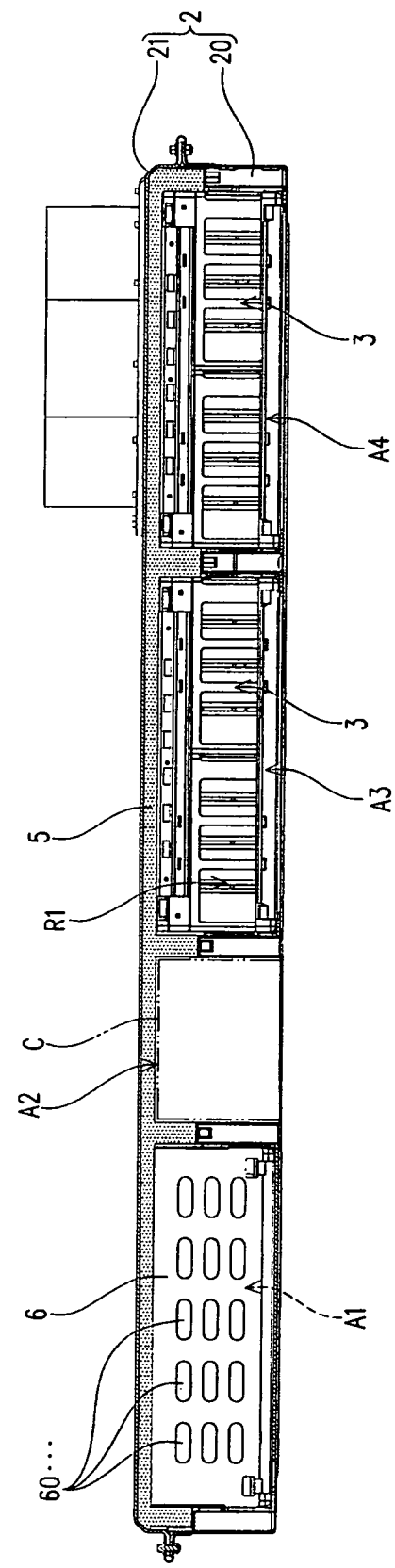
FIG. 17 is a vertical cross-sectional view without the link arms of the battery pack according to the embodiment and is a V-V cross-sectional view of FIG. 1.

As shown in FIGS. 16 and 17, the battery pack P includes a flow rate limitation member 6 arranged on an upstream area of the first passage R1 (area corresponding to the first area A1 in the present embodiment). The flow rate limitation member 6 is intended to limit the flow rate of the gas flowing toward the electric cells 1 in the first area A1 to a predetermined flow rate. More specifically, the flow rate limitation member 6 is provided to balance the flow rate of the gas flowing from the first passage R1 to the first area A1 and the flow rate of the gas flowing into the third area A3 and the fourth area A4.

The flow rate limitation member 6 is a plate material including a ventilation section 60 for sending gas at a predetermined flow rate into the electric cells 1 in the first area A1. The flow rate limitation member 6 is arranged to cover the ventilation spaces S in the first area A1 (hereinafter, the flow rate limitation member 6 will be referred to as a "flow rate limitation plate"). The ventilation section 60 includes one or more openings. The number, shape, and arrangement of the openings of the ventilation section 60 are appropriately set according to the feed rate (allowable flow rate) of the gas flowing through the first area A1 and the range of supply of the gas to the first area A1.

As shown in FIG. 4, the flow rate limitation plate 6 is arranged to slope downward from the first area A1 (electric cells 1) toward the lower circumferential wall 201 of the tray 20 (inner wall surface of the packaging case 2). With this configuration, water drops can be guided to the bottom of the first passage R1 by the slope of the flow rate limitation plate 6 when the water drops are attached to the flow rate limitation plate 6 due to dew condensation caused by the flow of gas into the first passage R1.

The battery pack P according to the present embodiment is designed as described above. The battery pack P is attached to the bottom of the car body of an electrically powered vehicle, such as an electric vehicle (EV) and a hybrid electric vehicle (HEV). The control apparatus C is connected to an electric system of a driving system or control system arranged on the vehicle through a cable. With this configuration, electric energy is supplied from the electric cells 1 to the electric system, and an electric power generator arranged on the vehicle charges the electric cells 1.

When the temperature of the electric cells 1 excessively increases or may excessively increase due to the charge and discharge of the electric cells 1 or the ambient environment (such as temperature), gas (outside air) is supplied into the packaging case 2 to cool the electric cells 1.

The flow of the gas in the battery pack P will be described here. The cooling fan F is driven if the temperature of the electric cells 1 excessively increases or may increase, and the gas (air) in the packaging case 2 is continuously discharged outside.

This causes the pressure in the packaging case 2 to become negative. Then, the pressure in the packaging case 2 tries to return to a normal pressure, and the open air is continuously drawn into the internal space of the packaging case 2 from the air intake opening. At this point, a flow of gas is formed in the packaging case 2 to cool the electric cells 1.

More specifically, the gas that entered into the first passage R1 from the air intake opening flows through the upstream of the first passage R1 corresponding to the first area A1 and through the downstream of the first passage R1 corresponding to the second area A2, the third area A3, and the fourth area A4 as shown in FIG. 15.

The cooling gas at a flow rate necessary to cool the electric cells 1 in the first area A1, of the gas entered into the first passage R1, passes through the ventilation sections 60 of the flow rate limitation plate 6. Meanwhile, the gas at a rate necessary to cool the electric cells 1 in the third area A3 and the fourth area A4 flows toward the downstream of the first passage R1 without passing through the ventilation sections 60 of the flow rate limitation plate 6.

The flow rate limitation plate 6 sets the flow rate of the gas flowing toward the third area A3 and the fourth area A4 to be greater than the flow rate of the gas flowing into the first area A1. The reason is as follows. The first area A1 is at a most upstream position of the passages (the first passage R1 and the second passage R2), and the gas flowing into the first area A1 from the first passage R1 and the gas discharged to the second passage R2 from the first area A1 are not affected by the heat of the cell modules 3 in the other areas. However, the gas entering into the third area A3 and the fourth area A4 are affected by the heat of the cell modules 3 in the first area A1 and the third area A3 on the upstream when the gas flows from the upstream. For this reason, the flow rate of the gas supplied to the downstream is set to be greater than the flow rate of the gas supplied to the first area A1 in the upstream area. This ensures all areas are uniformly cooled.

The cross-sectional area of the passage in the upstream area is smaller than the cross-sectional area of the passage in the downstream area of the first passage R1. Therefore, the flow velocity of the gas flowing through the upstream area of the first passage R1 is greater than in the downstream area, and the gas from the upstream area gains force to be efficiently supplied to the downstream.

The gas flowing through the first passage R1 flows into the first area A1, the third area A3, and the fourth area A4 to cool the electric cells 1 in the areas. More specifically, as shown in FIG. 3, the ventilation spaces S are formed between the electric cells 1 arranged in the areas A1, A3, and A4, and the ventilation spaces S are continuous from the first passage R1 to the second passage R2. Therefore, the gas flowing through the first passage R1 flows through the ventilation spaces S to cool the electric cells 1. Moreover, the front surfaces FS with large surface areas in the electric cells 1 face each other to form the ventilation spaces S in the present embodiment. Therefore, the contact areas between the gas and the cell cases 10 are increased, and the electric cells 1 are efficiently cooled.

As shown in FIGS. 4 and 5, the outside ventilation openings OP and the inside ventilation openings IP are formed, corresponding to the arrangement of the electric cells 1, on the frame section 351 and the cell restriction units 357*a* and 375*b* of the upper frame 350 that holds the plurality of electric cells 1. Therefore, the gas from the first passage R1 passes through the top passages TP of the cell modules 3 to also cool the connection terminals 11*a* and 11*b* of the electric cells 1.

The inside ventilation openings IP are formed, corresponding to the arrangement of the electric cells 1, in the cell restriction units 357*a* and 357*b* of the upper frame 350, and the gas guidance sections 311 are formed, corresponding to the arrangement of the inside ventilation openings IP, on the cell cover 31 that covers the upper frame 350. As a result, the gas is smoothly guided to the inside ventilation openings IP without staying outside the cell restriction units 357*a* and 357*b* of the upper frame 350 (areas where the connection terminals 11*a* and 11*b* are located).

The gas entered into the top passages TP of the cell modules 3 passes between the pair of cell restriction units 357*a* and 357*b* after passing through the inside ventilation openings IP on one side. In this manner, the circuit board CB arranged between the pair of cell restriction units 357*a* and 357*b* is cooled by the gas flowing between the pair of cell restriction units 357*a* and 357*b*. Therefore, the temperature does not unnecessarily rise due to external factors, etc., and the circuit board CB can routinely and accurately monitor the electric cells 1.

The circuit board CB is arranged on the board support sections 358 bridged between the pair of cell restriction units 357*a* and 357*b*. Therefore, it is unlikely that the circuit board CB is directly affected by the heat from normal electric cells 1. Therefore, in a normal state, a malfunction caused by thermal effect is prevented even without the gas flow.

The gas passed between the pair of cell restriction units 357*a* and 357*b* passes through the inside ventilation openings IP on the other side and cools the connection terminals 11*a* and 11*b* on the other side.

The gas that has cooled the connection terminals 11*a* and 11*b* passes through the outside ventilation openings OP of the other side of the frame section 351 and is discharged outside the cell modules 3, i.e., toward the adjacent cell module 3 or the second passage R2.

Since the ventilation openings 423 of adjacent module fixation members 4 communicate with each other, the gas passed through the top passages TP of the cell modules 3 enters into the top passages TP of the cell modules 3 arranged on the downstream through the ventilation openings 423 of the module fixation members 4 and flows to the downstream. The gas passed through the top passages TP of the cell modules 3 adjacent to the second passage R2 is discharged to the second passage R2.

As shown in FIGS. 18A and 18B, each of the terminal covers 33 that cover the positive electrode connection terminals 11*a* and the negative electrode connection terminals 11*b* of the assembled battery includes the cover ventilation section 330 on the longitudinal side wall 332 opposing the outside ventilation openings OP formed on the frame section 351. Therefore, the gas that has flown through the top passages TP and passed through the outside ventilation openings OP of the longitudinal beam 353*b* on the other side passes through the terminal cover 33 and is discharged from the cover ventilation section 330. With this configuration, the positive and negative electrode connection terminals 11*a* and 11*b* of the assembled battery and the surroundings can be cooled.

As shown in FIG. 15, three cell modules 3 are lined up in the row direction in each of the first area A1, the third area A3, and the fourth area A4. Therefore, in each area, two adjacent cell modules 3 are arranged so that the terminal cover 33 of one of the adjacent cell modules 3 opposes the terminal cover 33 of the other of the cell modules 3. The rest of the cell modules 3 in each area are arranged so that the longitudinal side wall 332 of the terminal cover 33 opposes the longitudinal beam 353*a* of the upper frame 350 of the adjacent cell module 3.

Therefore, as shown in FIG. 18A, in the cell modules 3 in which the longitudinal side walls 332 of the terminal covers 33 are arranged to oppose each other, the gas from the outside ventilation openings OP of the frame section 351 flows into the terminal cover 33, exits from the cover ventilation section 330 of the longitudinal side wall 332 of the terminal cover 33, flows into the terminal cover 33 from the cover ventilation section 330 of the terminal cover 33 of the other cell module 3, flows into the frame section 351 from the terminal cover 33, and exits from the outside ventilation openings OP on the opposite side.

As shown in FIG. 18B, in the cell modules 3 in which the longitudinal side wall 332 of the terminal cover 33 and the longitudinal beam 353*a* of the upper frame 350 are arranged to oppose each other, the gas discharged from the outside ventilation openings OP flows into the terminal covers 33 from the cover ventilation sections 330 of the terminal covers 33 and flows into the frame section 351 from the outside ventilation openings OP of the frame section 351. The gas flowing in the frame section 351 flows into the terminal cover 33 from the outside ventilation openings OP of the frame section 351, exits from the cover ventilation section 330 of the terminal cover 33, and flows into the outside ventilation openings OP of the adjacent cell module 3.

The gas passed through the cell modules 3 arranged in the first area A1, the third area A3, and the fourth area A4 flows through the second passage R2 and is sucked by the cooling fan F to be discharged to the outside from the exhaust opening.

The present invention is not limited to the above embodiment, and it is obvious that changes can be appropriately made without departing from the scope of the present invention.

For example, the battery pack may serve as a power source of an industrial vehicle, such as a fork lift and a crane truck, and various other devices. In other words, the battery pack can be mounted on various devices that require high-capacity power sources.

The plurality of electric cells 1 may be directly arranged in the packaging case 2 without being assembled into the cell modules 3.

The plurality of electric cells 1 may be lined up in one column (multiple rows and one column). In other words, it is only required that the plurality of electric cells 1 are lined up in at least one column.

The cooling fan F may be a blower and may be arranged at the air intake opening. With this configuration, gas can be sent from the air intake opening to the first passage R1 in the packaging case 2, and the gas can be passed through the ventilation spaces S to flow into the second passage R2 and to be discharged from the exhaust opening.

The flow rate limitation member 6 may be, for example, a mesh material in which a plurality of wires are connected in a crossed state. In this case, the wire diameter of the wire materials and the spaces between the wire materials can be appropriately set to provide an appropriate aperture ratio.

The internal space of the packaging case 2 may be composed of one area without being partitioned by the separation sections 204.

Areas for arranging the cell modules 3 may be consecutively lined up, and an area for arranging the control apparatus C may be provided at an end of the line. The control apparatus C may be arranged outside the packaging case 2, and only the electric cells 1 may be arranged in the internal space of the packaging case 2.

The cross-sectional areas of the first passage R1 may be equal or substantially equal throughout the entire length.

Instead of arranging the sealing member 5 (sponge) between the electric cells 1 and the cover 21 of the packaging case 2, projections abutted to the top surfaces TS of the electric cells 1 may be formed on the bottom surface of the top portion 210 of the cover 21.

A single cell holder 30 may hold the plurality of electric cells 1. Conversely, the cell module 3 may include three or more cell holders 30.

The circuit board CB is arranged between the board support section 358 of the upper frame 50 and the cell cover 31. However, the arrangement is not limited to this, and the circuit board CB may be arranged at any appropriate location.

The cell cover 31 may be formed to be able to cover the entire upper area of the electric cells 1, and instead of the terminal cover 33, the cell cover 31 may cover the positive and negative electrode connection terminals 11*a* and 11*b* of the assembled battery.

The invention claimed is:

1. A battery pack, comprising:
   a plurality of electric cells, each of the plurality of electric cells including outer surfaces one of which is provided with a positive electrode connection terminal and a negative electrode connection terminal; and
   a packaging case that accommodates the plurality of electric cells to align the plurality of electric cells at least in a first direction such that the positive electrode connection terminal and the negative electrode connection terminal of said each of the plurality of electric cells protrude upward from said one of the outer surfaces of the plurality of electric cells,
   wherein each adjacent ones of the plurality of electric cells in the first direction defines a ventilation space,
   wherein the packaging case defines first and second passages that extend in the first direction and that are arranged to have the plurality of electric cells located between the first and second passages in a second direction intersecting the first direction,
   wherein a gas supplied to the first passage flows through the ventilation spaces to the second passage,
   wherein the packaging case includes a flow rate limitation member, which is arranged biased in an upstream area of the first passage compared to other areas of the first passage, to limit a flow rate of the gas flowing into at least one of the ventilation spaces, which communicate with the upstream area of the first passage, to a predetermined flow rate,
   wherein the flow rate limitation member comprises a plate material that includes a ventilation section, the plate material being arranged to cover the at least one of the ventilation spaces, and
   wherein the packaging case includes an inner wall surface extending in the first direction, the first passage is defined between an alignment of the plurality of electric cells positioned at an outermost end in the second direction and the inner wall surface of the packaging case, and the flow rate limitation member is arranged to slope downward from said one of the outer surfaces of the plurality of electric cells to the inner wall surface of the packaging case while extending in the second direction.

2. The battery pack according to claim 1, wherein the ventilation section comprises a plurality of openings located along the first passage.

3. The battery pack according to claim 1, wherein the packaging case comprises a plurality of separation sections located at intervals in the first direction, the separation sections dividing an interior of the packaging case into a plurality of areas,
   wherein the plurality of electric cells are arranged in the plurality of areas, and
   wherein each of the separation sections comprises a through-hole at positions intersecting the first and second passages.

4. The battery pack according to claim 1, wherein a plurality of cell modules are provided, each of which comprises a predetermined number of the plurality of electric cells aligned in the first direction, and the flow rate limitation member is provided corresponding to at least one of the plurality of cell modules, which are in contact with the upstream area of the first passage.

5. The battery pack according to claim 1, wherein the first passage is defined to have a cross-sectional area of the upstream area of the first passage being less than a cross-sectional area of the first passage in a downstream area.

6. The battery pack according to claim 1, wherein the packaging case comprises a tray on which the plurality of electric cells are mounted and a cover that covers the plurality of electric cells on the tray, and
   wherein a sealing member that blocks a space defined between the plurality of electric cells and the cover is provided between the plurality of electric cells and the cover.

7. The battery pack according to claim 6, wherein the cover comprises an air intake opening at a position corresponding to the upstream area of the first passage, and an exhaust opening at a position corresponding to a downstream area of the second passage, and
   wherein a suction blower is mounted around the exhaust opening.

8. The battery pack according to claim 6, wherein the cover comprises an air intake opening at a position corresponding to the upstream area of the first passage, and an exhaust opening at a position corresponding to a downstream area of the second passage, and
   a blower is mounted around the intake opening.

9. The battery pack according to claim 1, wherein each of the plurality of electric cells has a greater width in the second direction than in the first direction.

10. The battery pack according to claim 1, wherein a limitation of the flow rate by the flow rate limitation member is greater in the upstream area than in the other areas of the first passage.

11. The battery pack according to claim 1, wherein the ventilation section comprises a plurality of openings located in the flow rate limitation member.

12. The battery pack according to claim 1, wherein the flow rate limitation member is arranged to slope downward from the plurality of electric cells toward a lower circumferential wall of the inner wall surface of the packaging case.

13. The battery pack according to claim 1, wherein an entirety of a downstream area of the first passage is devoid of the flow rate limitation member.

14. An electrically powered vehicle comprising the battery pack according to claim 1 as a power source.

15. A battery pack, comprising:
   a plurality of electric cells, each of the plurality of electric cells including outer surfaces one of which is provided with a positive electrode connection terminal and a negative electrode connection terminal; and
   a packaging case that accommodates the plurality of electric cells to align the plurality of electric cells at least in a first direction such that the positive electrode connection terminal and the negative electrode connection terminal of said each of the plurality of electric cells protrude upward from said one of the outer surfaces of the plurality of electric cells,
   wherein the packaging case defines first and second passages that extend in the first direction and that are arranged to have the plurality of electric cells located between the first and second passages in a second direction intersecting the first direction, wherein a gas supplied to the first passage flows through the second passage, wherein the packaging case includes a flow rate limitation member, which is located in an upstream area of the first passage rather than a downstream area of the first passage, to limit a flow rate of the gas, wherein each adjacent ones of the plurality of electric cells in the first direction defines a ventilation space, wherein the flow rate limitation member comprises a plate material that includes a ventilation section, the plate material being arranged to cover the at least one of the ventilation spaces, and wherein the packaging case includes an inner wall surface extending in the first direction, the first passage is defined between an alignment of the plurality of electric cells positioned at an outermost end in the second direction and the inner wall surface of the packaging case, and the flow rate limitation member is arranged to slope downward from said one of the outer surfaces of the plurality of electric cells to the inner wall surface of the packaging case while extending in the second direction.

16. The battery pack according to claim 15, wherein the flow rate limitation member is only located in the upstream area of the first passage.

17. The battery pack according to claim 16, wherein the ventilation section comprises a plurality of openings located in the flow rate limitation member.

18. The battery pack according to claim 17, wherein the flow rate limitation member is arranged to slope downward from the plurality of electric cells toward a lower circumferential wall of the inner wall surface of the packaging case.

* * * * *